(12) United States Patent
Storti

(10) Patent No.: US 10,366,419 B2
(45) Date of Patent: *Jul. 30, 2019

(54) ENHANCED DIGITAL MEDIA PLATFORM WITH USER CONTROL OF APPLICATION DATA THEREON

(71) Applicant: Roland Storti, Mentone (AU)

(72) Inventor: Roland Storti, Mentone (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/944,807

(22) Filed: Apr. 4, 2018

(65) Prior Publication Data

US 2018/0225717 A1 Aug. 9, 2018

Related U.S. Application Data

(63) Continuation-in-part of application No. 15/668,724, filed on Aug. 4, 2017, which is a continuation-in-part
(Continued)

(51) Int. Cl.
*G06Q 30/02* (2012.01)
*G06Q 20/06* (2012.01)
(Continued)

(52) U.S. Cl.
CPC ......... *G06Q 30/0267* (2013.01); *G06Q 20/06* (2013.01); *G06Q 20/3272* (2013.01);
(Continued)

(58) Field of Classification Search
None
See application file for complete search history.

(56) References Cited

U.S. PATENT DOCUMENTS

| 7,359,889 B2 | 4/2008 | Wang et al. |
| 7,500,007 B2 | 3/2009 | Ikezoye et al. |

(Continued)

FOREIGN PATENT DOCUMENTS

| CA | 2457089 A1 | 2/2003 |
| CA | 2777170 A1 | 4/2011 |

(Continued)

OTHER PUBLICATIONS

US Trademark Registration No. 5202534; Mark—MINFO Filing date: Nov. 18, 2014 Publication date: Feb. 28, 2017.
(Continued)

*Primary Examiner* — Richemond Dorvil
*Assistant Examiner* — Thuykhanh Le
(74) *Attorney, Agent, or Firm* — Legalforce RAPC Worldwide

(57) ABSTRACT

A method includes, through a digital platform, encoding a digital media file related to a message from a publisher with decodable data, generating a modified digital media file therefrom, capturing, through a client application of a mobile device of a client user, the modified digital media file playing on a broadcasting device to generate capture data therefrom, and generating a response action of the client user based on analyzing the capture data. The method also includes associating the response action to the message of the publisher, automatically interpreting, through the client application, the modified digital media file to decode the decodable data therein, enabling initiation of the response action without interrupting an experience of concurrent sensing of media content through the broadcasting device by the client user, and providing a capability to the client user to control data thereof generated through the initiated response action.

20 Claims, 16 Drawing Sheets

Related U.S. Application Data of application No. 14/092,874, filed on Nov. 27, 2013, now Pat. No. 9,755,770.

(60) Provisional application No. 61/730,071, filed on Nov. 27, 2012.

(51) Int. Cl.
*G06Q 20/32* (2012.01)
*H04H 60/07* (2008.01)
*H04H 60/48* (2008.01)
*H04H 60/63* (2008.01)
*G06F 3/0482* (2013.01)

(52) U.S. Cl.
CPC ......... *G06Q 30/0261* (2013.01); *H04H 60/07* (2013.01); *H04H 60/48* (2013.01); *H04H 60/63* (2013.01); *G06F 3/0482* (2013.01)

(56) References Cited

U.S. PATENT DOCUMENTS

| | | | |
|---|---|---|---|
| 7,711,564 B2 | 5/2010 | Levy et al. | |
| 7,986,913 B2 | 7/2011 | Wang | |
| 8,015,123 B2 | 9/2011 | Barton et al. | |
| 8,055,364 B2 | 11/2011 | Champion | |
| 8,396,100 B2 | 3/2013 | Corts et al. | |
| 8,464,290 B2 | 6/2013 | Beyda et al. | |
| 8,508,357 B2 | 8/2013 | Srinivasan et al. | |
| 8,595,058 B2 | 11/2013 | Fordyce et al. | |
| 8,688,600 B2 | 4/2014 | Barton et al. | |
| 8,724,436 B2 | 5/2014 | Nathan et al. | |
| 8,843,391 B2 | 9/2014 | Fordyce et al. | |
| 8,885,821 B2 | 11/2014 | Grube et al. | |
| 8,959,366 B2 | 2/2015 | Grube et al. | |
| 9,035,163 B1 | 5/2015 | Mohajer et al. | |
| 9,048,963 B1 | 6/2015 | Paulus et al. | |
| 9,088,626 B2 | 7/2015 | McLane et al. | |
| 9,094,186 B2* | 7/2015 | Corts | H04L 7/04 |
| 9,225,444 B2 | 12/2015 | Wang | |
| 9,253,285 B2 | 2/2016 | McLane et al. | |
| 9,363,856 B2* | 6/2016 | Rutgers | H05B 33/0818 |
| 9,633,371 B1 | 4/2017 | Mohajer et al. | |
| 9,721,287 B2 | 8/2017 | Barton et al. | |
| 2002/0072982 A1 | 6/2002 | Barton et al. | |
| 2003/0009694 A1* | 1/2003 | Wenocur | G06Q 10/107 726/4 |
| 2003/0041110 A1* | 2/2003 | Wenocur | G06Q 10/107 709/206 |
| 2005/0028189 A1 | 2/2005 | Heine et al. | |
| 2005/0100113 A1* | 5/2005 | Corts | H04H 20/30 375/295 |
| 2005/0267817 A1 | 12/2005 | Barton et al. | |
| 2007/0143777 A1 | 6/2007 | Wang | |
| 2008/0154714 A1* | 6/2008 | Liu | G01C 21/30 705/14.25 |
| 2008/0262928 A1* | 10/2008 | Michaelis | G06Q 30/02 705/14.26 |
| 2009/0012849 A1 | 1/2009 | Penrose Barton et al. | |
| 2009/0150918 A1 | 6/2009 | Wu et al. | |
| 2009/0259325 A1 | 10/2009 | Topchy | |
| 2009/0267895 A1* | 10/2009 | Bunch | G06F 3/0386 345/157 |
| 2011/0054647 A1* | 3/2011 | Chipchase | H04M 3/42127 700/94 |
| 2011/0093327 A1* | 4/2011 | Fordyce, III | G06Q 20/10 705/14.39 |
| 2011/0182424 A1 | 7/2011 | Grube et al. | |
| 2011/0182429 A1 | 7/2011 | Grube et al. | |
| 2011/0185193 A1 | 7/2011 | Grube et al. | |
| 2011/0209213 A1* | 8/2011 | Wooten | G06F 12/14 726/21 |
| 2011/0246284 A1* | 10/2011 | Chaikin | G06O 20/105 705/14.38 |
| 2011/0313762 A1* | 12/2011 | Ben-David | G10L 13/08 704/231 |
| 2011/0314132 A1 | 12/2011 | Penrose Barton et al. | |
| 2012/0109734 A1 | 5/2012 | Fordyce et al. | |
| 2012/0197981 A1* | 8/2012 | Chan | G06O 30/0276 709/203 |
| 2012/0278886 A1* | 11/2012 | Luna | G06F 21/552 726/22 |
| 2013/0031600 A1* | 1/2013 | Luna | G06F 21/554 726/1 |
| 2013/0103651 A1* | 4/2013 | Jha | G06F 11/0748 707/687 |
| 2013/0110637 A1* | 5/2013 | Bott | G06F 16/9574 705/14.64 |
| 2014/0007246 A1* | 1/2014 | Nelson | H04L 63/12 726/26 |
| 2014/0029701 A1* | 1/2014 | Newham | H04L 7/041 375/340 |
| 2014/0032677 A1* | 1/2014 | Pittenger | H04L 12/1831 709/205 |
| 2014/0080505 A1* | 3/2014 | Vannucci | G01S 5/0205 455/456.1 |
| 2014/0214532 A1 | 7/2014 | Barton et al. | |
| 2014/0343419 A1* | 11/2014 | Sako | A61B 8/585 600/437 |
| 2014/0351048 A1 | 11/2014 | Fordyce et al. | |
| 2015/0113094 A1 | 4/2015 | Williams et al. | |
| 2015/0146711 A1* | 5/2015 | Corts | H04H 20/30 370/350 |
| 2015/0245431 A1* | 8/2015 | Rutgers | H05B 33/0815 315/210 |
| 2015/0295706 A1 | 10/2015 | Corts et al. | |
| 2017/0133022 A1 | 5/2017 | Gurijala et al. | |

FOREIGN PATENT DOCUMENTS

| | | |
|---|---|---|
| CA | 2871916 A1 | 11/2013 |
| CA | 2556552 C | 2/2015 |
| CN | 101602855 A | 8/2010 |
| JP | 2005500736 A | 1/2005 |
| JP | 2007529029 A | 10/2007 |
| JP | 2010525462 A | 7/2010 |
| JP | 2015520979 A | 7/2015 |
| KR | 101381859 B1 | 4/2014 |
| WO | 2002011123 A2 | 2/2002 |
| WO | 2002061652 A2 | 8/2002 |
| WO | 2003009592 A1 | 1/2003 |
| WO | 2003017540 A2 | 2/2003 |
| WO | 2005079499 A2 | 9/2005 |
| WO | 2008042953 A1 | 4/2008 |
| WO | 2008131181 A2 | 10/2008 |
| WO | 2011046667 A2 | 4/2011 |
| WO | 2011140269 A1 | 11/2011 |
| WO | 2012112573 A1 | 8/2012 |
| WO | 2012170353 A1 | 12/2012 |
| WO | 2012170451 A1 | 12/2012 |
| WO | 2013150325 A1 | 10/2013 |
| WO | 2013166158 A1 | 11/2013 |

OTHER PUBLICATIONS

"Minfo official website" by Minfo, Found Online [Jan. 24, 2018] http://www.minfo.com.au/Home.aspx.
"Technology—LISNR" by LISNR, Found Online [Jan. 24, 2018] http://lisnr.com/technology/.
"Coding Transmit data with Chirp technology" by Chirp, Found Online [Jan. 24, 2018] https://www.chirp.io/.
"Shazam official website" by Shazam, Found Online [Jan. 24, 2018] https://www.shazam.com/company.

* cited by examiner

EXAMPLE BUTTONS 1400 ON LANDING PAGE 1402 REACHED BY CLIENT USER 107

ENHANCED DIGITAL MEDIA PLATFORM WITH USER CONTROL OF APPLICATION DATA THEREON

CLAIM OF PRIORITY

This patent application is a Continuation-In-Part application of co-pending U.S. patent application Ser. No. 15/668,724 titled METHOD, DEVICE AND SYSTEM OF ENCODING A DIGITAL INTERACTIVE RESPONSE ACTION IN AN ANALOG BROADCASTING MESSAGE filed on Aug. 4, 2017. Co-pending patent application Ser. No. 15/668,724 is a Continuation-In-Part application of U.S. patent application Ser. No. 14/092,874 titled METHOD, DEVICE AND SYSTEM OF ENCODING A DIGITAL INTERACTIVE RESPONSE ACTION IN AN ANALOG BROADCASTING MESSAGE filed on Nov. 27, 2013 and issued as U.S. Pat. No. 9,755,770 on Sep. 5, 2017. U.S. patent application Ser. No. 14/092,874 is a Conversion Application of U.S. Provisional Patent Application No. 61/730,071 titled MINFO PLATFORM filed on Nov. 27, 2012. This patent application hereby incorporates by reference the entirety of the disclosures of all of the aforementioned patent applications.

FIELD OF TECHNOLOGY

This disclosure relates generally to digital platforms and, more particularly, to an enhanced digital media platform with user control of application data thereon.

BACKGROUND

A mobile device may be able to hear acoustical ranges beyond that of a human ear. However, the mobile device may not be aware of how to interpret the audio data.

A merchant (e.g. a department store, a small shop, a vendor) may wish to communicate advertisements to customers. The merchant may include audible advertisements that speak aloud to customers (e.g. as they pass by in an isle), or may include store-wide sound dispersal of an advertisement (e.g. PA announcements of on sale items). This may annoy customers who may have been otherwise enjoying music or a quiet environment (e.g. a bookstore).

Advertisers already communicating with potential customers through visual or audible mediums (e.g. a television commercial, a radio program, a billboard on the freeway) may not be able to connect with customers because there advertisement does not last long enough for the potential customer to remember brand names or product names, or write down important contact information (e.g. an advertiser's website, phone number, etc.).

During regular programming of entertainment media (e.g. television shows, on-demand movies, online videos, radio programming, etc.) advertisers may not be able to relay their message because it will interrupt the program for some potential customers, even if a few potential customers may want to know who is sponsoring the entertainment media. Therefore, a potentially valuable connection may not form between the advertiser and the customer.

SUMMARY

Disclosed are a method, a device and a system of an enhanced digital media platform with user control of application data thereon.

In one aspect, a method includes validating, through a digital platform, a user of the digital platform as a publisher of a message as a digital media file, and encoding, through the digital platform, the digital media file associated with the message with decodable data using a unique identifier. The decodable data in one instance is an audio stream at a frequency audible to a human ear and, in another instance, is an audio stream at an ultrasound frequency inaudible to the human ear.

The method also includes generating, through the digital platform, a modified digital media file from the digital media file based on the encoding of the digital media file associated with the message with the decodable data such that an audio stream associated with the modified digital media file encoded with the decodable data is interpretably indistinguishable from a primary audio stream associated with the digital media file through the human ear, capturing, through a client application of a mobile device of a client user of the digital platform, the modified digital media file playing on a broadcasting device to generate capture data therefrom based on metadata associated with the mobile device, and generating, through the digital platform, a response action of the client user based on analyzing the capture data from the mobile device to extract elements therefrom and comparing the extracted elements to data stored in a database.

Further, the method includes associating, through a processor and a memory of the digital platform, the response action of the client user in an interactive form to the message of the publisher. The response action is a call-back action, a web-form action, and/or a resource-page redirect action for the client application of the mobile device of the client user. The call-back action includes triggering of a phone call to the publisher via a user interface of the client application or a button action via the user interface of the client application. The web-form action is display of a set of forms chosen by the publisher on the user interface of the client application, and the resource-page redirect action is display of a webpage through the user interface of the client application and/or a browser of the mobile device.

Still further, the method includes automatically interpreting, through the client application, the modified digital media file in both the one instance and the another instance to decode the decodable data therein, enabling, through the client application, the client user to initiate the response action in the interactive form to the message of the publisher without interrupting an experience of concurrent sensing of media content through the broadcasting device by the client user in accordance with the automatic interpretation of the modified digital media file and the association of the response action, the message accompanying the media content being sensed by the client user, and via the digital platform, providing, through the client application, a capability to the client user to control data thereof generated through the initiated response action within the digital platform instead of the client user being limited to predefined capabilities within the digital platform.

In another aspect, a non-transitory medium, readable through a digital platform and including instructions embodied therein that are executable through the digital platform, is disclosed. The non-transitory medium includes instructions to validate a user of the digital platform as a publisher of a message as a digital media file, and to encode the digital media file associated with the message with decodable data using a unique identifier. The decodable data in one instance is an audio stream at a frequency audible to a human ear and, in another instance, is an audio stream at an ultrasound frequency inaudible to the human ear.

The non-transitory medium also includes instructions to generate a modified digital media file from the digital media file based on the encoding of the digital media file associated with the message with the decodable data such that an audio stream associated with the modified digital media file encoded with the decodable data is interpretably indistinguishable from a primary audio stream associated with the digital media file through the human ear, to capture, through a client application of a mobile device of a client user of the digital platform, the modified digital media file playing on a broadcasting device to generate capture data therefrom based on metadata associated with the mobile device, and to generate a response action of the client user based on analyzing the capture data from the mobile device to extract elements therefrom and comparing the extracted elements to data stored in a database.

Further, the non-transitory medium includes instructions to associate, through a processor and a memory of the digital platform, the response action of the client user in an interactive form to the message of the publisher. The response action is a call-back action, a web-form action, and/or a resource-page redirect action for the client application of the mobile device of the client user. The call-back action includes triggering of a phone call to the publisher via a user interface of the client application or a button action via the user interface of the client application. The web-form action is display of a set of forms chosen by the publisher on the user interface of the client application, and the resource-page redirect action is display of a webpage through the user interface of the client application and/or a browser of the mobile device.

Still further, the non-transitory medium includes instructions to automatically interpret, through the client application, the modified digital media file in both the one instance and the another instance to decode the decodable data therein, to enable, through the client application, the client user to initiate the response action in the interactive form to the message of the publisher without interrupting an experience of concurrent sensing of media content through the broadcasting device by the client user in accordance with the automatic interpretation of the modified digital media file and the association of the response action, the message accompanying the media content being sensed by the client user, and to provide, through the client application, a capability to the client user to control data thereof generated through the initiated response action within the digital platform instead of the client user being limited to predefined capabilities within the digital platform.

In yet another aspect, a system includes a mobile device of a client user, and a digital platform. The digital platform is configured to validate a user of the digital platform as a publisher of a message as a digital media file, and to encode the digital media file associated with the message with decodable data using a unique identifier. The decodable data in one instance is an audio stream at a frequency audible to a human ear and, in another instance, is an audio stream at an ultrasound frequency inaudible to the human ear.

The system is also configured to generate a modified digital media file from the digital media file based on the encoding of the digital media file associated with the message with the decodable data such that an audio stream associated with the modified digital media file encoded with the decodable data is interpretably indistinguishable from a primary audio stream associated with the digital media file through the human ear, to enable capturing, through a client application of the mobile device of the client user, the modified digital media file playing on a broadcasting device to generate capture data therefrom based on metadata associated with the mobile device, and to generate a response action of the client user based on analyzing the capture data from the mobile device to extract elements therefrom and comparing the extracted elements to data stored in a database.

Further, the system is configured to associate, through a processor and a memory of the digital platform, the response action of the client user in an interactive form to the message of the publisher. The response action is a call-back action, a web-form action, and/or a resource-page redirect action for the client application of the mobile device of the client user. The call-back action includes triggering of a phone call to the publisher via a user interface of the client application or a button action via the user interface of the client application. The web-form action is display of a set of forms chosen by the publisher on the user interface of the client application, and the resource-page redirect action is display of a webpage through the user interface of the client application and/or a browser of the mobile device.

Still further, the system is configured to enable automatic interpretation, through the client application, the modified digital media file in both the one instance and the another instance to decode the decodable data therein, to enable, through the client application, the client user to initiate the response action in the interactive form to the message of the publisher without interrupting an experience of concurrent sensing of media content through the broadcasting device by the client user in accordance with the automatic interpretation of the modified digital media file and the association of the response action, the message accompanying the media content being sensed by the client user, and to provide, through the client application, a capability to the client user to control data thereof generated through the initiated response action within the digital platform instead of the client user being limited to predefined capabilities within the digital platform.

The methods and systems disclosed herein may be implemented in any means for achieving various aspects, and may be executed in a form of a machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, a device and a system of an enhanced digital media platform with user control of application data thereon. Although the present embodiments have been described with reference to specific example embodiments, it will be evident that various modifications and changes may be made to these embodiments without departing from the broader spirit and scope of the various embodiments.

Figure 1:
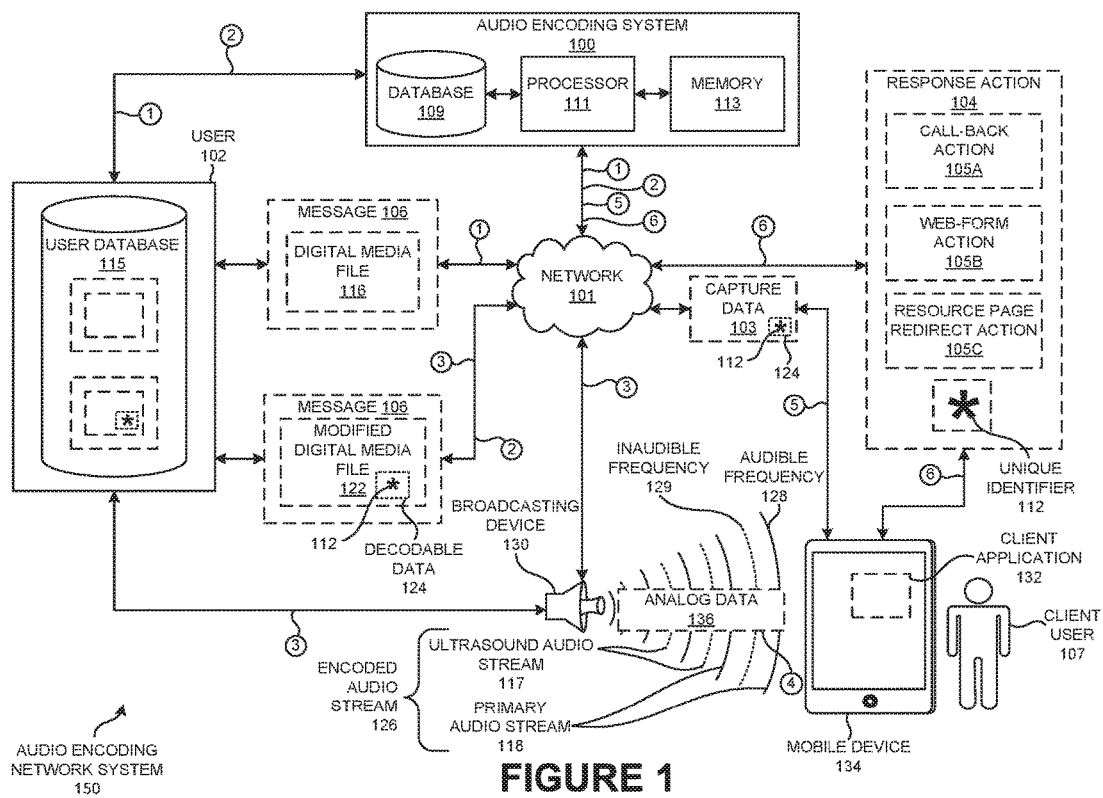
FIG. 1 is a network view illustrating an audio encoding system communicatively coupled with a broadcaster and a mobile device, according to one embodiment.

FIG. 1 is a network view 150 illustrating an audio encoding system (e.g., audio encoding network system 150) communicatively coupled with a broadcaster and a mobile device, according to one embodiment.

Particularly, FIG. 1 illustrates an audio encoding system 100, a network 101, a user 102, a capture data 103, a response action 104, a call-back action 105A, a web-form action 105B, a resource-page redirect action 105C, a message 106, a client user 107, a database 109, a processor 111, a unique identifier 112, a memory 113, user database 115, digital media file 116, ultrasound audio stream 117, primary audio stream 118, modified digital media file 122, decodable data 124, encoded audio stream 126, audible frequency 128, broadcasting device 130, client application 132, mobile device 134, and analog data 136.

The audio encoding system 100 may receive the message 106 in the form of the digital media file 116 from the user 102 along path 'circle 1'. The digital media file 106 may be transmitted to the audio encoding system 100 either through the network 101 (e.g. the internet, local area network) or may be physically delivered to the audio encoding system 100 (e.g. delivered on a flash storage memory, in an external hard drive, etc.), The audio encoding system 100, in a process which will be described in FIG. 2, may then modify the digital media file 116 of the message 106 into the form of a modified digital media file 122 bearing the decodable data 124. The modified digital media file 122 may then be transmitted along path 'circle 2' back to the user 102 where it may be stored in the user database 115. For example, the audio encoding system 100 may send the modified digital media file 122 bearing the decodable data 124 to the user 102 through the network 101 or may be physically delivered.

The user 102 may then play the modified digital media file 122 bearing the decodable data 124 on a broadcasting device 130 (e.g. a loudspeaker, a megaphone, computer speakers, television speakers, an automobile stereo system) by conveying the modified digital media file 122 along path 'circle 3'. For example, the user 102 may effectuate the playing of the modified digital media file 122 on the broadcasting device 130 by transferring the modified digital media file 122 to media stored on a website (e.g., a YouTube® video, a Netflix® video, a sound played in conjunction with an online banner advertisement). Alternatively, the modified digital media file 122 may reach the broadcasting device 130 by being physically transferred to the broadcasting device 130 (e.g., by delivering the modified digital media file 122 a pre-recorded radio or television program to a radio or television network for broadcasting; by burning the modified digital media file 122 onto a compact disk that is played inside a retail store; by integrating the modified digital media file 122 into sound-generating devices not connected to the network 101). The modified digital media file 122 may allow the broadcasting device 130 to play the encoded audio stream 126 which may include the ultrasound audio stream 117 and/or the primary audio stream 118. The ultrasound audio stream 117 may include the inaudible frequency 129 (e.g, be of such high frequency as to be inaudible to the human ear, or be of such low frequency as to be inaudible to the human ear), and the primary audio stream may contain the audible frequency 128. Once played on the broadcasting device 130, the encoded audio stream 126 may create the analogue data 136 along path 'circle 4' which may travel as a set of analogue sound waves in air.

The client user 107 may have the mobile device 134, that uses a processor and a memory, and that may have the client application 132 installed. The client application 132 may analyze the analogue data 136 created by the broadcasting device 130 playing the encoded audio stream 126. The mobile device may create the capture data 103 from both the analogue data 136 (including the decodable data 124 and/or the unique identifier 112) and metadata (e.g., a timestamp, a current geospatial location, a set of past geospatial locations, a set of user preferences, a set of advertising histories) associated with the mobile device 134.

The capture data 103 may move along path 'circle 5' through the network 101 to the audio encoding system 100. In a process that will be described in detail in conjunction with the description of FIG. 3, the audio encoding system 100 may generate the response action 104 which may include a call-back action 105A, a web-form action 105B, a resource page redirect action 105C, and/or a unique identifier 112. The call-back action 105A may be an action to be performed by the client application 132 and/or the mobile device 134 whereby the mobile device 134 may call a phone number associated with the user 102. For example, the call-back action 105A may be a button provided within the user interface of the client application 132 which, when activated by the client user 107 may call a phone number associated with the user 102 (e.g., a sales representative of the user 102, a payment center, a donation service). The web-form action 105B may include a series of data fields that the client user 107 may enter information for submission to the user 102 (e.g. through the network 101). The web-form action 105B may include displaying on the user interface of the mobile device 134 a set of forms within the client application 132 chosen by the user 102 within a browser-based interface that the user 102 may use to set response action 104 parameters within the audio encoding system 100. For example, the web-form action 105B may include presenting the client user 107 with a survey (e.g., asking to questions about the media associated with the encoded audio stream 126, for example to rate its content) or data fields specialized for payment (e.g., for credit card number, credit card expiration, PayPal® information). The resource-page redirect action 105C may include a uniform resource locator (URL) to display a web page (which may be associated with the user 102) within the client application 132 and/or in a browser of the mobile device 134 (e.g. Google Chrome®, Safari®).

Figure 2:
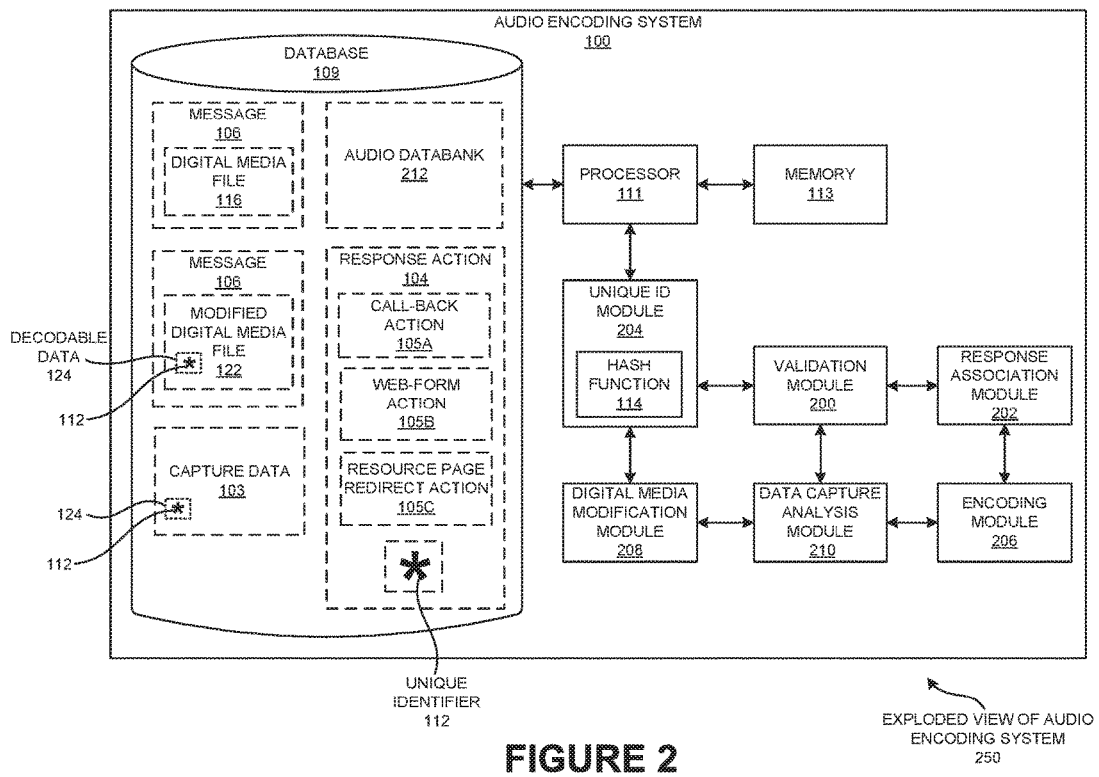
FIG. 2 is an exploded view of the audio encoding system, according to one embodiment.

The response action 104 may include a unique identifier 112 generated by hash function 114 (as shown and described in conjunction with FIG. 2) and the Unique ID module 204 (as shown and described in conjunction with FIG. 2).

The response action 104 may be transmitted along path 'circle 6' through the network 101 to the mobile device 134. For example, the response action 104 may be in the form of the web-form action 105B that upon arriving at the mobile device 134 may display survey fields to the client user 107 within the client application 132.

It should be appreciated that the audio encoding system 100 may be two separate systems, one that may generate the modified digital media file 122 bearing the decodable data 124 from the digital media file 116 and another that generate the appropriate response 104 from the capture data 103 transmitted from the client user 107's mobile device 134.

FIG. 2 is an exploded view of the audio encoding system 250, according to one embodiment.

Particularly, FIG. 2 further illustrates a hash function 114, a validation module 200, a response module 202, a unique ID module 204, an encoding module 206, a digital medial modification module 208, a data-capture module 210, and an audio databank 212.

In FIG. 2, the validation module 200 may validate a user of the audio encoding system as a publisher. For example, the validation module may determine that the user of the audio encoding system is associated with a publisher (e.g., an advertiser).

The response association module 202 may associate the response action 104 to the message of the user 106. The response association module 202 may also associate the response action 104 with the unique identifier 112.

The unique ID module 204 may include a hash function 114. The Unique ID module 204 may generate the unique identifier 112 through the hash function 114 applied to the response action associated with the message 106 of the user 102.

The encoding module 206 may encode the digital media file 116 associated with the message 106 with the decodable data 124 using the unique identifier 112 such that the decodable data 124 is indistinguishable from a primary audio stream 118 through a human ear.

The digital media modification module 208 may generate the modified digital media file 122 associated with the digital media file 116 based on the encoding of the message 106 with the decodable data 124 such that the decodable data 124 is indistinguishable from a primary audio stream 118 through the human ear.

The data capture module analysis module 210 may analyze the capture data 103 such that the client user 107, the decodable data 124, the unique identifier 112, and/or metadata (e.g., a time stamp, a geospatial location, a set of user preferences) may be extracted and compared to data within the database 109 to generate the response action 104.

The database 109 may store the message 106 which includes the digital media file 116, the message 106 which includes the modified digital media file 122 bearing the decodable data 124, the capture data 103, the response actions 104 (including data associated with the correct execution, presentation and display of the call-back action 105A, the web-form action 105B, and the resource page redirect action 105C on the client application 132 of the mobile device 134). The database 109 may also store the audio databank 212 which may include decodable data 124, digital media files 116, and modified digital media files 122.

Figure 3:
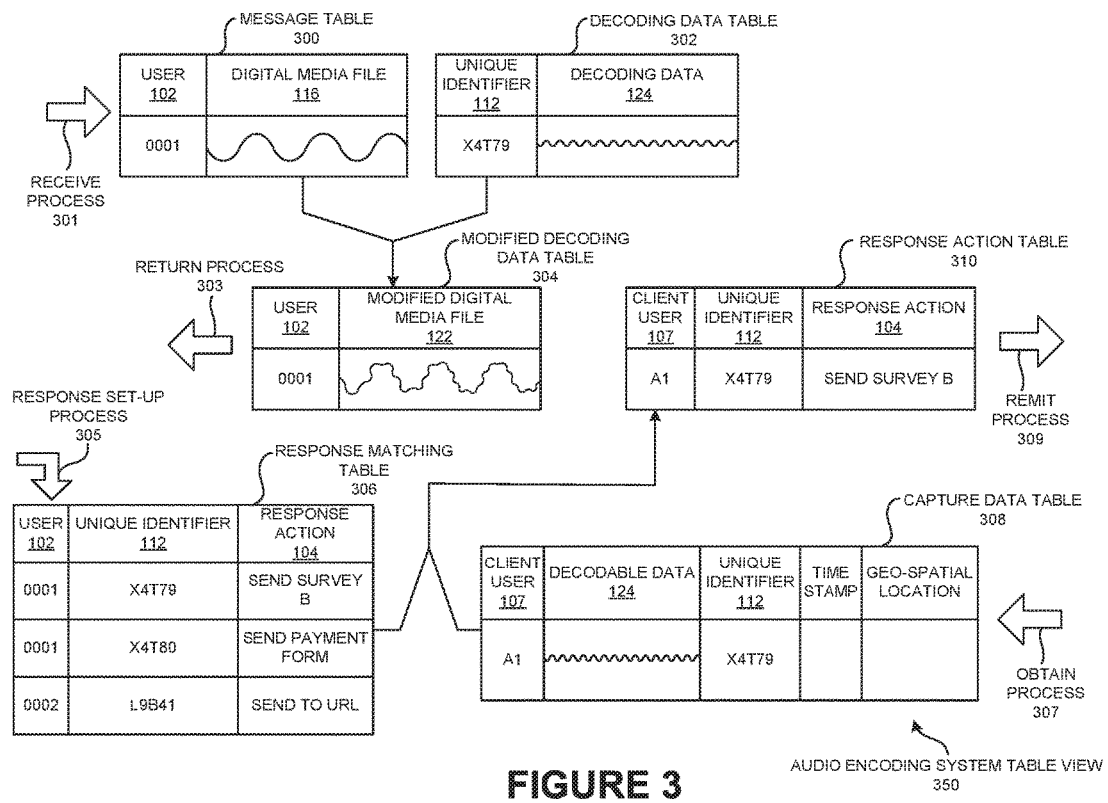
FIG. 3 is a table view of a database that may store a message in the audio encoding system, according to one embodiment.

FIG. 3 is an audio encoding system table view 350 of a database that may store a response action in the audio encoding system, according to one embodiment.

Particularly, FIG. 3 further illustrates a message table 300, a receive process 301 whereby the user provides the digital media file 116, a decoding data table 302, a return process 303 whereby the modified digital media file 122 is returned to the user 102, a modified decoding data table 304, a response set-up process 305 whereby the user 102 may modify the response action 104, a response matching table 306, an obtain process 307, a capture data table 308, a remit process 309, and a response action table 310.

The audio encoding system 100 may receive the digital media file 116 from the user 102 in the form of a message table 300 by the receive process 301 (e.g., physically conveyed to the audio encoding system 100, uploaded in an mp3 or m4a over the network 101). The digital media file 116 may be modified using a decoding data table 302 which includes decodable data 124 and a unique identifier 112. The resulting modification may give rise to the modified recording data table 304 which may include the information identifying user 102 and may include the modified digital media file 122. The modified digital media file 122 may then be returned to the user 102 by the return process 303 (e.g., physically conveyance to the user 102, downloading an mp3 or m4a over the network 101).

The user 102 may modify the response matching table 306 through the response set-up process 305 (e.g., logging into a browser-based application to access the database 109 of the audio encoding system 100). The response matching table 306 may include the identifying information for the user 102, the unique identifier 112, and/or the response action 104.

The capture data table 308 may be sent to the audio encoding system 100 through the obtain process 307 (e.g., the mobile device 134 sending and/or uploading the capture data 103 through the network 101). The capture data table may include information identifying the client user (e.g., a unique user identification, a login name, an email address, a phone number), the decodable data 124, the unique identifier 112, and metadata (e.g., a time stamp associated with the creation of the capture data 103, a geospatial location associated with the creation of the capture data 103).

The audio encoding system 100 may compare the unique identifier 112 in the capture data table 308 to the unique identifier 112 in the response matching table 306. The audio encoding system 100 may then generate the response action table 310 if a match is found between the unique identifier 112 of the capture data table 308 and the other unique identifier 112 of the response matching table 306. The response action table 310 may contain information identifying the client user 107, the unique identifier 112, and the response action 104 which was associated with the unique identifier 112 during the response set up process 305.

The response action table 310 may be sent as the response data 104 to the mobile device 134 of the client user 107 by the remit process 309 (e.g., sending through the network 101).

Figure 4:
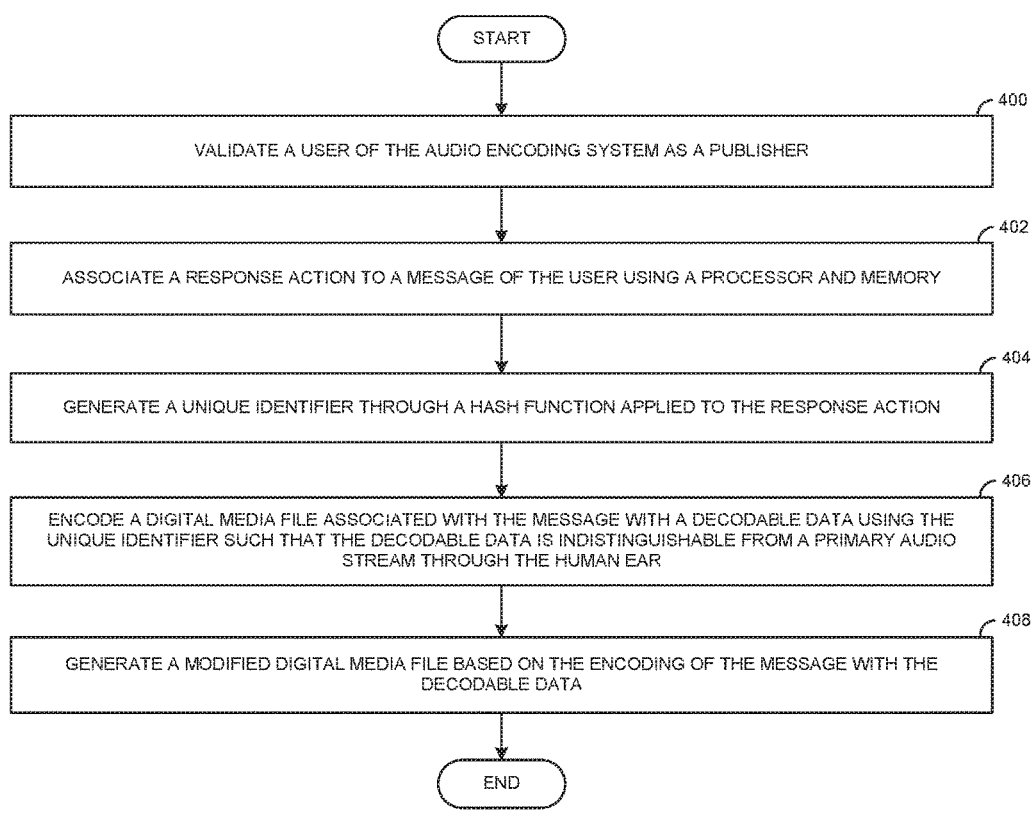
FIG. 4 is a graphical process flow illustrating an encoding process, according to one embodiment.

FIG. 4 is a graphical process flow illustrating an encoding process, according to one embodiment. In step 400, the user 102 may be validated as a publisher (e.g., someone who creates a creative content associated with an advertisement and/or the message 106 of a display at a museum 108 and/or a retail store 110). In step 402, the response action 104 (e.g., may be based on a preset group of templates) may be associated to the message 106 of the publisher using the processor 111 and the memory 113. In step 404, the unique identifier 112 may be generated through the hash function 114 applied to the response action 104 (e.g., may be based on a preset group of templates). In step 406, the message 106 associated with the publisher may be encoded the digital media file 116 associated with the message 106 with the decodable data 124 using the unique identifier 112 such that the decodable data 124 is indistinguishable from the primary audio stream 118 through a human ear. In step 408, the modified digital media file 122 associated with the digital media file 116 may be generated based on the encoding of the message 106 with the decodable data 124 such that the decodable data 124 is indistinguishable from a primary audio stream 118 through the human ear 120.

Figure 5:
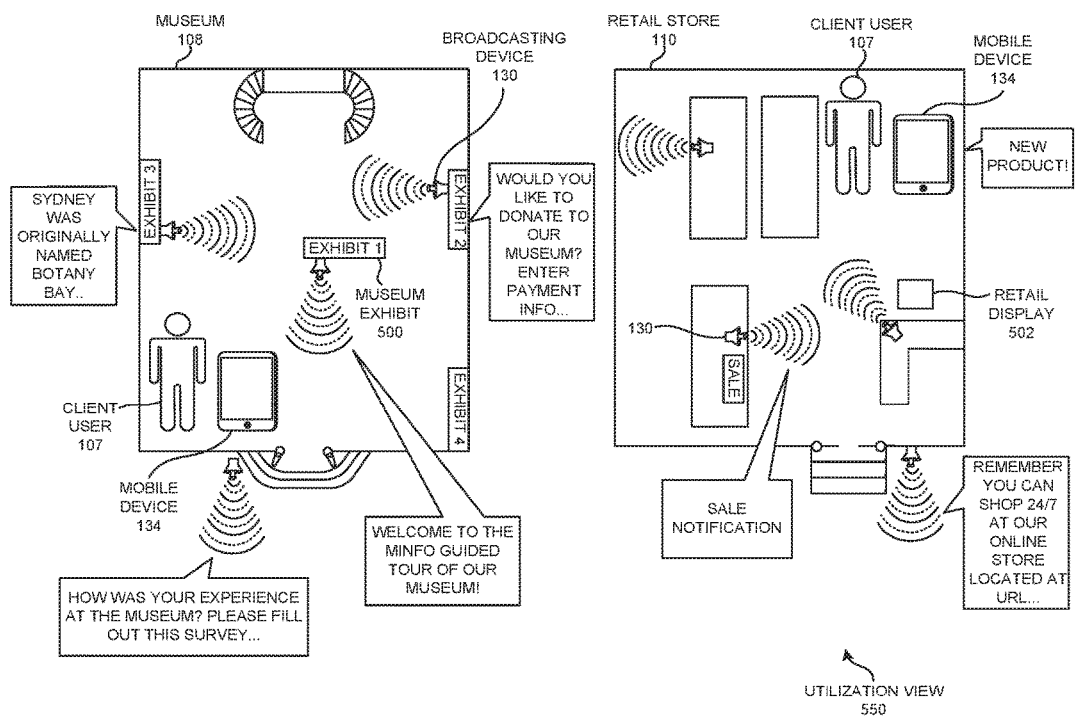
FIG. 5 is a utilization view in which a museum and a retail store utilize the various embodiments described herein to communicate additional messages through the audio encoding system to recipients, according to one embodiment.

FIG. 5 is a utilization view 550 in which a museum and a retail store utilize the various embodiments described herein to communicate additional messages through the audio encoding system to recipients, according to one embodiment.

Particularly, FIG. 5 further illustrates a museum 108, a retail store 110, a museum exhibit 500, and a retail display 502.

In FIG. 5, a client user 107 may decide to visit the museum 108 (e.g., a botanical garden, the Smithsonian Institute, a historical landmark, a national park, a temple, a cathedral, an art installation, a gallery) with his or her mobile device 134. The museum 108 may include multiple exhibits 500. A broadcasting device 130 may be associated with each museum exhibit 500 such that the broadcasting device 130 may emit the encoded audio stream 126, the ultrasound audio stream 117, the primary audio stream 118, the inaudible frequency 129, and/or the audible frequency 128. The client user 107 may use his mobile device 134 to capture analogue data 136 that may be associated with the encoded audio steam data 126. After communication with the audio encoding system through the network 101, the response action 104 may reach the client application 132 on the mobile device 134. For example, in the educational museum context, the response action 104 may include webpages built by the museum to explain the exhibit 500, may send a form soliciting feedback one the client user 107's experience in the museum, and/or send a form soliciting a donation from the client user 107. The primary audio stream 118 may be very soft are almost completely silent as to prevent disturbance of patrons in the museum. A graphical symbol on the exhibit may alert patrons when they are within range the of encoded audio stream.

In FIG. 5 the client user 107 using the mobile device 134 may also read encoded audio streams 126 in the retail store 110 (e.g, a mall, a grocery store, a pharmacy, a department store). For example, the broadcasting device 130 may be associated with a retail display 502, which may promote sale items, featured products, or new goods. The broadcasting device 130 may also be located outside the retail store 110 such that people passing by may acquire the response action 104 without entering the retail store 110. For example, the exterior broadcasting device 130 may play the encoded audio stream 126 associated with the response action 104 of sending the resource page redirect action 105B for webpages associated with the retail establishment 110 that list upcoming discounts, new products that may soon be in stock and/or a URL to an online store.

In one embodiment, a method of an audio encoding system 100 includes validating a user 102 of the audio encoding system 100 as a publisher (e.g., someone who creates a creative content associated with an advertisement and/or a message 106 of a display at a museum 108 and/or a retail store 110), associating a response action 104 (e.g., may be based on a preset group of templates) to a message 106 of the publisher (e.g., someone who creates a creative content associated with an advertisement and/or a message 106 of a display at a museum 108 and/or a retail store 110), the response action 104 (e.g., may be based on a preset group of templates) is a call-back action 105A (e.g., such that a mobile device 134 automatically dials an advertiser), a web-form action 105B (e.g., to enable a respondent to fill out a survey), and/or a resource-page redirect action 105C (e.g., to redirect to a user to a different webpage) using a processor and a memory, generating a unique identifier 112 through a hash function 114 applied to the response action 104 (e.g., may be based on a preset group of templates) associated with the message 106 of the publisher (e.g., someone who creates a creative content associated with an advertisement and/or a message 106 of a display at a museum 108 and/or a retail store 110), encoding a digital media file 116 associated with the message 106 with a decodable data 124 using the unique identifier 112 such that the decodable data 124 is indistinguishable from a primary audio stream 118 through a human ear 120, and generating a modified digital media file 122 associated with the digital media file 116 based on the encoding of the message 106 with the decodable data 124 such that the decodable data 124 is indistinguishable from a primary audio stream 118 through the human ear 120.

The decodable data 124 may be an encoded audio stream 126 at an audible frequency 128 or an ultrasound audio stream 127 that may be at an inaudible frequency 129. The modified digital media file 122 may be communicated from a broadcasting device 130 to a client application 132 of a mobile device 134 as an analog data 136. The client application 132 may identify the modified digital media file 122 through an analysis of the analog data 136. The client application 132 may separate the modified digital media file 122 into the digital media file 116 and the decodable data 124.

The client application 132 may analyze the decodable data 124 using an algorithm that results in a extraction of the unique identifier 112 and the response action 104 (e.g., may be based on a preset group of templates) associated with the message 106 of the publisher (e.g., someone who creates a creative content associated with an advertisement and/or a message 106 of a display at a museum 108 and/or a retail store 110) from the decodable data 124. The client application 132 may be redirected to an internet protocol address based on the response action 104 (e.g., may be based on a preset group of templates).

The mobile device 134 may perform the response action 104 (e.g., may be based on a preset group of templates) comprising the call-back action 105A (e.g., such that a mobile device 134 automatically dials an advertiser), the web-form action 105B (e.g., to enable a respondent to fill out a survey), and/or the resource-page redirect action 105C (e.g., to redirect to a user to a different webpage) based on an instruction at the internet protocol address to which the client application 132 may be redirected. The publisher (e.g., someone who creates a creative content associated with an advertisement and/or a message 106 of a display at a museum 108 and/or a retail store 110) may be an advertiser (e.g., the user 102 may be the advertiser), and the message 106 may be an advertisement associated with a promotion (e.g., the message 106 may be the advertisement and/or the promotion) offered by the advertiser. In addition, the message 106 an explanation associated with a display a museum 108 or a retail store 110.

In another embodiment method of a mobile device 134 includes analyzing a modified digital media file 122 communicated from a broadcasting device 130 to a client application 132 of the mobile device 134 as an analog data 136 using a processor and a memory of the mobile device 134, identifying the modified digital media file 122 through the analysis of the analog data 136, separating the modified digital media file 122 into a digital media file 116 and a decodable data 124, and analyzing the decodable data 124 using an algorithm that results in a extraction of a unique identifier 112 and a response action 104 (e.g., may be based on a preset group of templates) associated with a message 106 of a user 102 of an audio encoding system 100 from the decodable data 124.

In yet another embodiment, a system includes an audio encoding system 100, a broadcasting device 130, and a mobile device 134. In this embodiment, the audio encoding system 100 generates a modified digital media file 122 associated with a digital media file 116 based on an encoding a message 106 with a decodable data 124 such that the decodable data 124 is indistinguishable from a primary audio stream 118 through a human ear 120. In addition, the broadcasting device 130 distributes the modified digital media file 122. In addition, the mobile device 134 analyzes the decodable data 124 using an algorithm that results in a extraction of a unique identifier 112 and a response action 104 (e.g., may be based on a preset group of templates) associated with a message 106 of a user 102 of the audio encoding system 100 from the decodable data 124.

Outbound messages may be delivered via any media end, leaving the receiving consumer to either take action immediately and/or determine to remember to take action at some future point. However, each message may be followed by another message diverting and distracting them, people are busy and their recall quickly dissipates away as time elapses beyond the message, they may forget the message and the offer and to take action. As a result, the marketer's message may not deliver a response from the maximum potential number of consumers who had an initial interest in and intent to respond to the message and its offer. In addition, marketers may have inaccurate and often ill-defined response and effectiveness data regarding the medium in which they may invest to disseminate their message.

By connecting a medium-appropriate 'signifier' to a message that can be recognized by an application installed on a mobile device 134 that can correlate the unique signifier with specific campaign content. Campaigns can be simply created by a marketer/user in minutes using the developed Platform via a computer interface, delivering these campaigns via a users/consumers mobile device when they see or hear a an audio-embeddable content (e.g., a Minfo® campaign) campaign in Print, billboards, signage, or on Radio, TV, Cinema, YouTube, Pre-roll and/or internet.

The marketer may be able to extend the campaign beyond the finite duration of the initial message/medium and invite interested consumers to 'opt-in' and interact with both the brand and the offer. As a result, consumers who may have adequate interest and who can pro-actively interact and take action via their mobile device, should they wish to do so. The solution may pull forward responses which may otherwise have been lost/not occurred, and may compresses the timeline of interaction with the message through to purchase by enabling the customer at the point of initial interest generated by the ad or message. By putting the means to interact into the consumer's hand via their mobile device, the various embodiments may invite real-time interaction with the message at an impulse.

As result, the various embodiments disclosed herein have the potential to reduce the frequency of messages to generate an equivalent level of commercial revenue. Additionally, as response may be per consumer-specific and interactive with their device, marketers may be able to access accurate and clearly defined response data. As each interaction via the device may recorded, the various embodiments may be able to provide real-time quantitative and qualitative response data relating to the effectiveness of their communications campaign strategies and investment decisions.

Push frequency to create recall of the ad and the offer, inclusion of specific campaign inclusions and details to measure response volume on an A/B split testing basis, repetition of and stress on the call to action e.g., 'Call Now', Hurry Stocks Are Limited" etc. However, this may not really enabling a user/consumer to immediately take action. Development of Database to allow the creation, deployment and logging of interaction of each and every campaign is disclosed according to one embodiment. Technology to encode audio files and assigning unique codes to each QR code is disclosed according to one embodiment.

Technology to encode ultrasound into audio files and assigning unique codes to each QR is disclosed according to one embodiment. Technology for creation of QR codes and assigning unique codes to each QR code is disclosed according to one embodiment. Development of IOS, Android and WIN mobile device platforms is disclosed according to one embodiment. Integration with IOS, Android and WIN utilities such as mapping, calendars, SMS etc. is disclosed according to one embodiment. Development of reporting and analytical tools according to one embodiment.

For example, Bob Jones may download an application (e.g., a Minfo® application—the client application 132) on his Apple iPhone® (e.g., the mobile device 134). Then, Bob may listen to an advertisement during his favorite soccer match between Australia and New Zealand. Bob may access a promotional item associated with the advertisement for Zops Detergent automatically when the application on his Apple iPhone® detects a decodable data (e.g., the decodable data 124) in a modified digital media file (e.g., the Zops Detergent advertisement). Then, the application (e.g., the client application 132) may automatically call Zop's detergent's survey hotline (e.g., the response data associated with the decodable data may be a call-back number).

In addition, a web page may automatically open up through which Bob can get the $20 coupon for a six pack of Zops laundry detergent. Bob may be delighted that he was able to quickly respond to an advertisement he just heard in a low friction manner, with no searching or interruption to his viewing of the Australia vs. New Zealand match. Bob may be further delighted when Australia wins the match, and he sees a free t-shirt offer automatically pop up on the application (e.g., the client application 132) when a promotional Australia t-shirt is offered in an ultrasound signal associated with the game ending.

Bob's mobile device (e.g., the mobile device 134) may be able to hear acoustical ranges beyond that of a human ear. Through the application, Bob's mobile device is aware of how to interpret indistinguishable to a human ear audio data. Similarly, Zops laundry detergent (e.g., a merchant) may now communicate advertisements to customers through the application (e.g., the client application 132), according to one embodiment. Zops may not need to annoy customers with audible advertisements that speak aloud to customers (e.g. as they pass by in an isle), or include store-wide sound dispersal of an advertisement (e.g. PA announcements of on sale items) both of which may have annoyed otherwise loyal Zops customers.

Zops, which may already communicating with potential customers through visual or audible mediums (e.g. a television commercial, a radio program, a billboard on the freeway), may now be able to connect with customers because their advertisement lasts longer for potential customers to remember brand names or product names through the application (e.g., the client application 132).

During regular programming of entertainment media (e.g. television shows, on-demand movies, online videos, radio programming, etc.) Zop may now be able to relay their message because it will not interrupt the program for potential customers having the application (e.g., the client application 132) installed on their mobile devices (e.g., the mobile device 134). Therefore, a potentially valuable connection may be formed between Zops and customers like Bob Jones.

Figure 6:
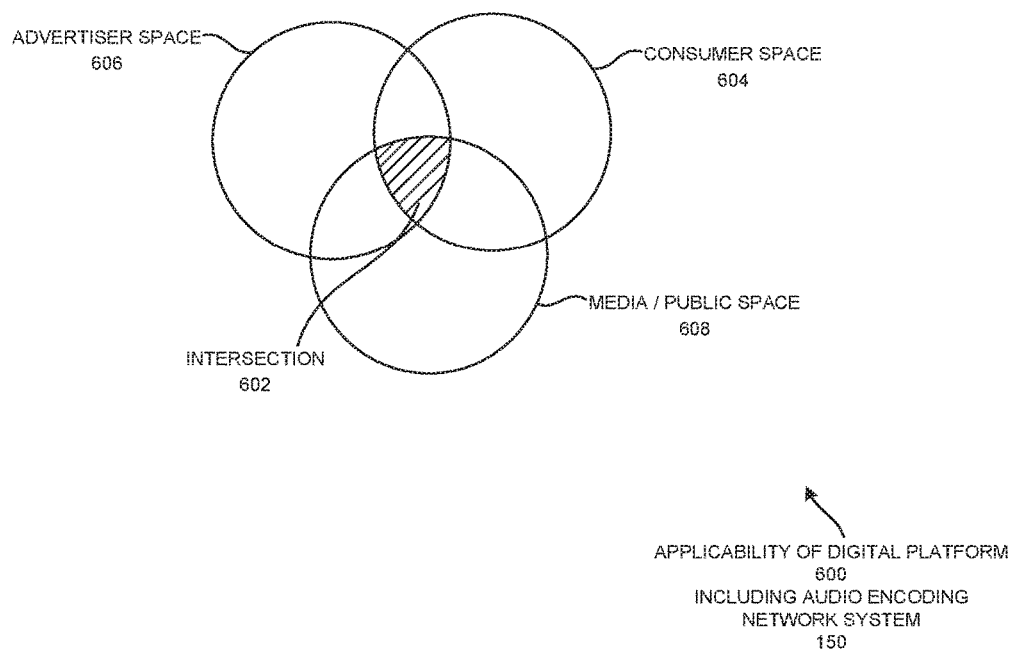
FIG. 6 is an illustrative view of applicability of a digital platform including the audio encoding network system of FIG. 1 at an intersection of a consumer space, an advertiser space and a media/public space, according to one embodiment.

FIG. 6 shows applicability of a digital platform 600 including audio encoding network system 150 at an intersection 602 of a consumer space 604, an advertiser space 606 and a media/public space 608, according to one or more embodiments. In one or more embodiments, client user 107 may be the "consumer," user 102 may be the publisher (e.g., "advertiser") and an entity related to broadcasting device 130 may be the "media" providing a "public" space. It should be noted that reasonable variations are within the scope of the exemplary embodiments therein. Typical digital platforms merely exploit the intersection of advertiser space 606 and media/public space 608. In contrast, exemplary embodiments implemented through digital platform 600 may empower the "consumer" enough to make him/her an active participant in his/her experience based on operation thereof at intersection 602.

Figure 7:
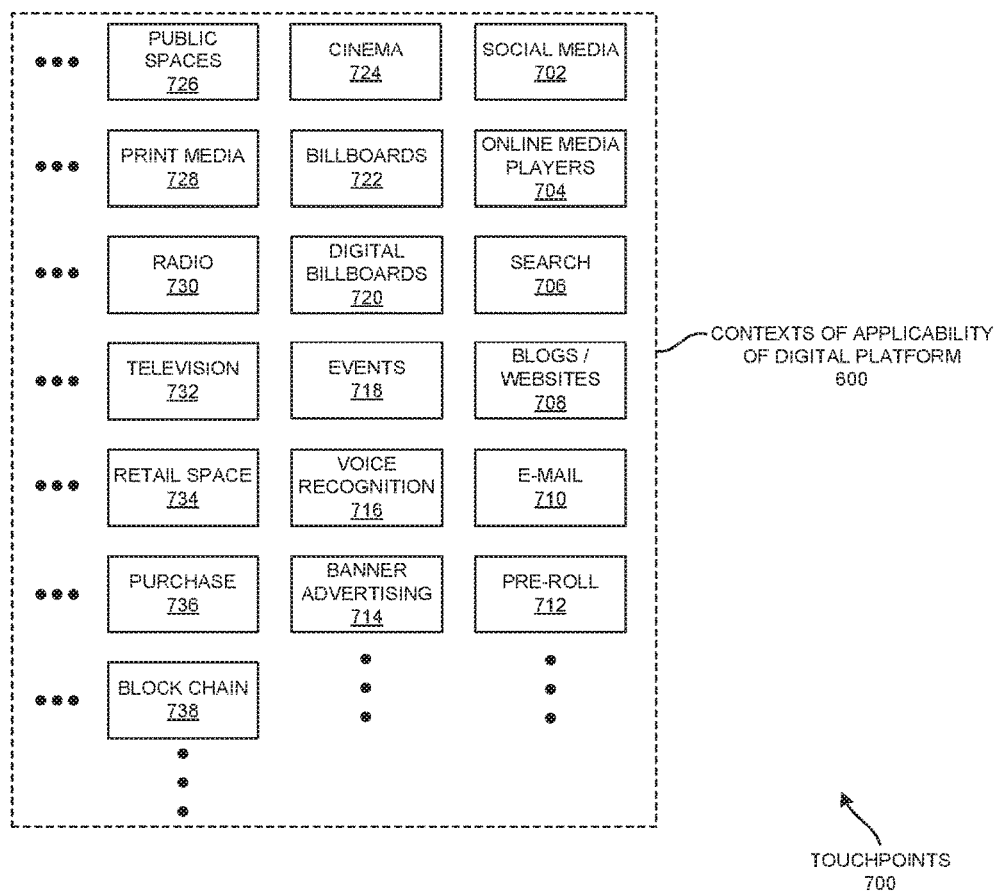
FIG. 7 is a schematic view of touchpoints representing contexts in which the digital platform of FIG. 6 is applicable.

FIG. 7 shows touchpoints 700 representing contexts in which digital platform 600 (e.g., Minfo® platform) providing client application 132 may be applicable. Example touchpoints 700 may include social media 702 (e.g., where data related to endorsements and recommendations of a product related to user 102 may be obtained; where advertisements representing decodable messages through client application 132 may be relayed as part of client user 107 experience; where one client user 107 may recommend products/services related to user 102 to another client user), online media players 704 (e.g., YouTube®, through which a promotional item related to user 102 may be accessed by client user 107 based on detection of decodable data through client application 132 during an advertisement, a sports video/stream and/or a movie), and search 706 (e.g., rendering smartlinks containing offers accessible following a search process conducted through a search engine).

Other examples of touchpoints 700 may include but are not limited to blogs/websites 708, e-mail 710, pre-roll 712 (e.g., an online advertisement at the beginning of a video), cinema 724, billboards 722, digital billboards 720, events 718 (e.g., networking, registration processes, name tag exchanges, customer feedback, access to presentations), voice recognition 716, banner advertising 714, public spaces 726 (e.g., museums, tourist information), print media 728, radio 730, television 732, retail space 734, purchase 736 (e.g., online transactions) and blockchain 738 (e.g., platform in which records grow as part of distributed databases; to be discussed below). It should be noted that touchpoints 700 are not limited to the examples shown in FIG. 7 and that other examples are within the scope of the exemplary embodiments discussed herein.

Figure 8:
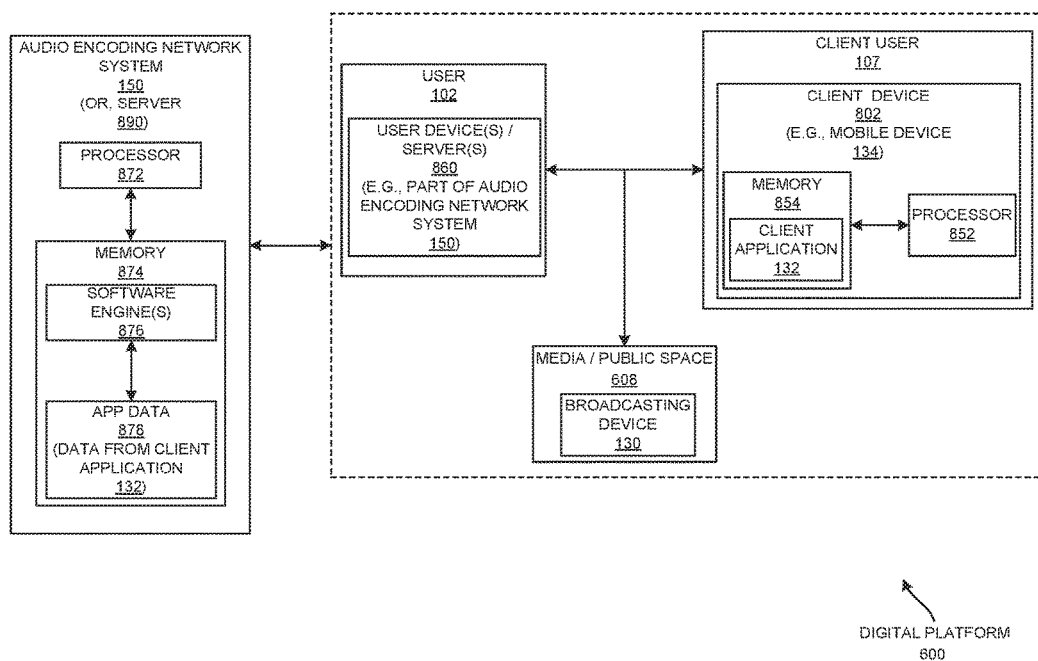
FIG. 8 is a schematic view of the digital platform of FIG. 6, according to one embodiment.

FIG. 8 shows digital platform 600, according to one or more embodiments. As discussed above, in one or more embodiments, digital platform 600 may operate at intersection 602 of consumer space 604, advertiser space 606 and media/public space 608. In one or more embodiments, user 102 may be relevant to advertiser space 606, which may include a number of user device(s)/server(s) 860 that are part of audio encoding network system 150 (e.g., audio encoding system 100 including processor 111 and memory 113 of FIG. 1). In one or more embodiments, client user 107 may represent consumer space 604, which may include a client device 802 (e.g., mobile device 134 of FIG. 1) executing client application 132. Client device 802 in FIG. 8 is shown as including a processor 852 communicatively coupled to a memory 854; client application 132 executable through processor 852 is shown as part of memory 854.

In one or more embodiments, media/public space 608 may be represented by broadcasting device 130; other device(s)/server(s) (not shown) may be part of media/public space 608. In one or more embodiments, as discussed above, digital platform 600 may operate at intersection 602; audio encoding network system 150 (or, server 890; or, audio encoding system 100; or, a network of servers) may be facilitated therefor through execution of appropriate software engine(s) 876 thereon. FIG. 8 shows software engine(s) 876 in a memory 874 of audio encoding network system 150 communicatively coupled to a processor 872 thereof; software engine(s) 876 may execute through processor 872. It should be noted that processor 872 and memory 874 may represent a network (e.g., distributed; part of network 101) of processors and memories.

In one or more embodiments, through operation at intersection 602, digital platform 600 may be configured to obtain data from various contexts and from various parties (e.g., user 102, client user 107, media/public space 6008). In one or more embodiments, execution of client application 132 at various contexts/touchpoints 700 may yield valuable data; the aforementioned is shown as app data 878 stored in memory 874; app data 878 may be captured based on execution of software engine(s) 876.

Figure 9:
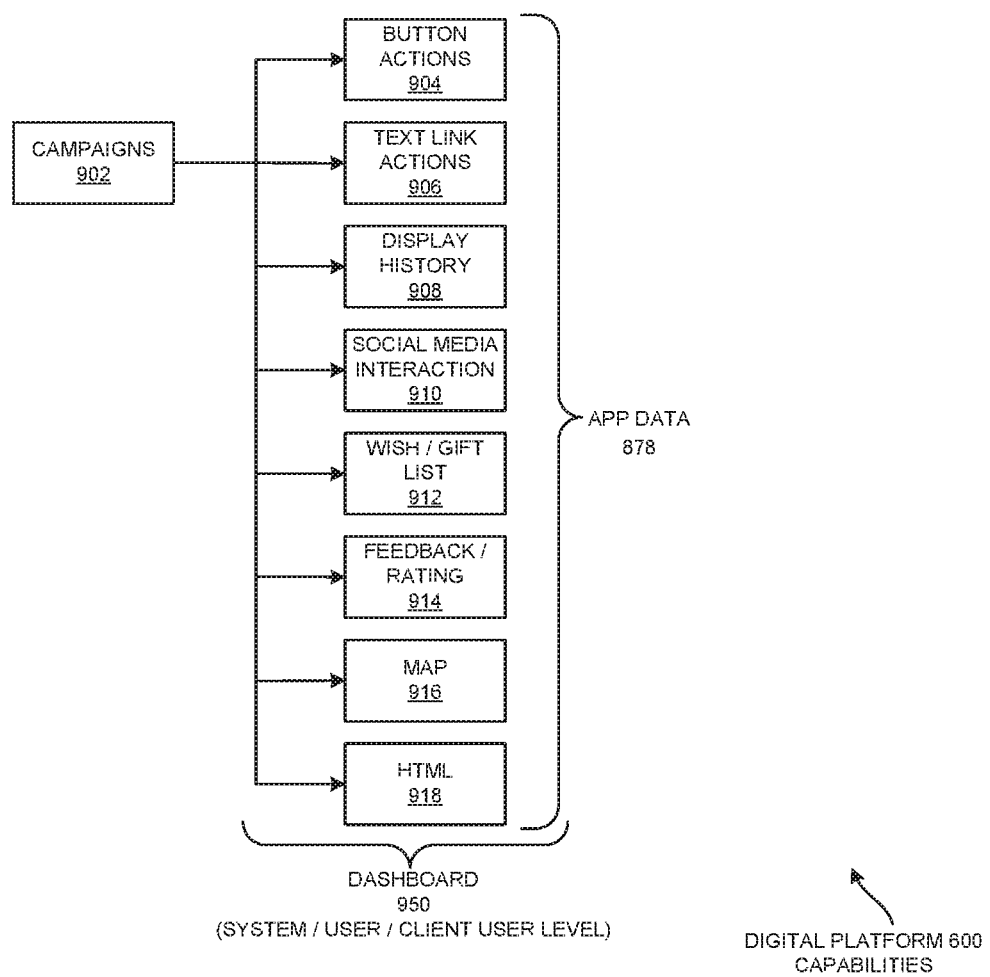
FIG. 9 is a schematic view of capabilities of the digital platform of FIG. 6 with respect to campaigns related to the user of FIG. 1, according to one or more embodiments.

FIG. 9 shows capabilities of digital platform 600 with respect to campaigns 902 related to user 102, according to one or more embodiments. In one or more embodiments, for campaigns 902, user 102, in conjunction with audio encoding network system 150, may define button actions 904 (e.g., part of call-back action 105A) and text link actions 906 on behalf of client user 107. The aforementioned may be part of response action 104 of FIG. 1. Other definitions may include display history 908 (e.g., audio/video files, interactions through client application 132 at an app zone provided by digital platform 600), social media interaction 910, wish/gift list 912, feedback/rating 914 (e.g., again, may be part of response action 104), map 916 (e.g., links to operating system mapping utilities) and Hypertext Markup Language (HTML) 918.

With respect to HTML 918, the creator (e.g., user 102) of a campaign 902 may enter HTML content in free format to appear in landing pages (e.g., landing page 1402, to be discussed below) to which client user 107 may be directed to; the creator may also enter text, images and buttons to appear in the aforementioned landing pages. It should be noted that the order in which the elements (e.g., text, images, buttons, HTML) appear on a landing page may be configurable by user 102 and/or client user 107.

Interactions of client application 132 based on all of the abovementioned definitions may yield app data 878, as shown in FIG. 9. In one or more preferred embodiments, client user 107 may be permitted to customize the abovementioned definitions, as will be discussed below. In one or more embodiments, campaigns 902 may yield a dashboard 950 representing complete analytics of campaigns 902 across each media type. In one or more embodiments, dashboard 950 may be obtained at all levels—system/user (e.g., user 102)/client user (e.g., client user 107).

Figure 10:
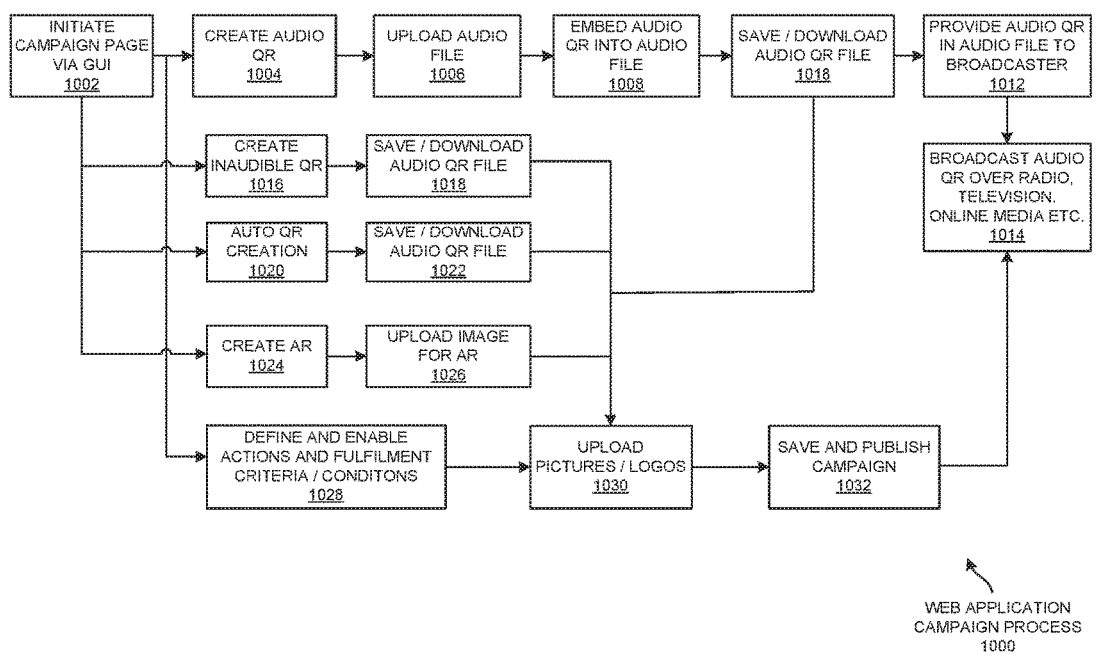
FIG. 10 is a schematic view of a web application campaign process, according to one embodiment.

FIG. 10 shows a web application campaign process 1000, according to one or more embodiments. In one or more embodiments, operation 1002 may involve initiating a campaign page associated with said process via a Graphical User Interface (GUI). In one or more embodiments, operation 1004 may involve creating an audio QR. In one or more embodiments, operation 1006 may involve uploading an audio file (e.g., digital media file 116). In one or more embodiments, operation 1008 may involve embedding audio QR into the audio file. In one or more embodiments, operation 1010 may involve saving or downloading the audio QR file (e.g., modified digital media file 122).

In a parallel set of processes, operations 1016 and 1020 may involve creation of inaudible QR and auto QR respectively. In one or more embodiments, the aforementioned operations may be followed by operations 1018 and 1022, each of which involves saving or downloading the audio QR file, respectively. In one or more embodiments, another parallel set of operations, operation 1024 and 1026, may involve creation of Augmented Reality (AR) codes to enhance user interactivity in digital platform 600 (operation 1024) and uploading of an image for the AR (operation 1026).

In yet another parallel process following initiation of the campaign page, user 102 may define and enable actions and fulfilment criteria/conditions on behalf of client user 107 in operation 1028. In one or more embodiments, operation 1030 may involve uploading pictures/logos. In one or more embodiments, the audio QR file following operations 1010, 1018 and 1022, the image for AR following operation 1026, and the uploaded pictures/logos 1030 following operation 1030 may be saved to enable publishing the campaign in operation 1032.

In one or more embodiments, the audio QR in audio QR file following operation 1016 may be provided to a broadcaster in operation 1012. In one or more embodiments, said audio QR may be broadcast over radio, television, online media etc. in operation 1014. Also, in one or more embodiments, the published campaign may effectuate actions (e.g., response action 104) during the broadcast of the audio QR in operation 1014.

Figure 11:
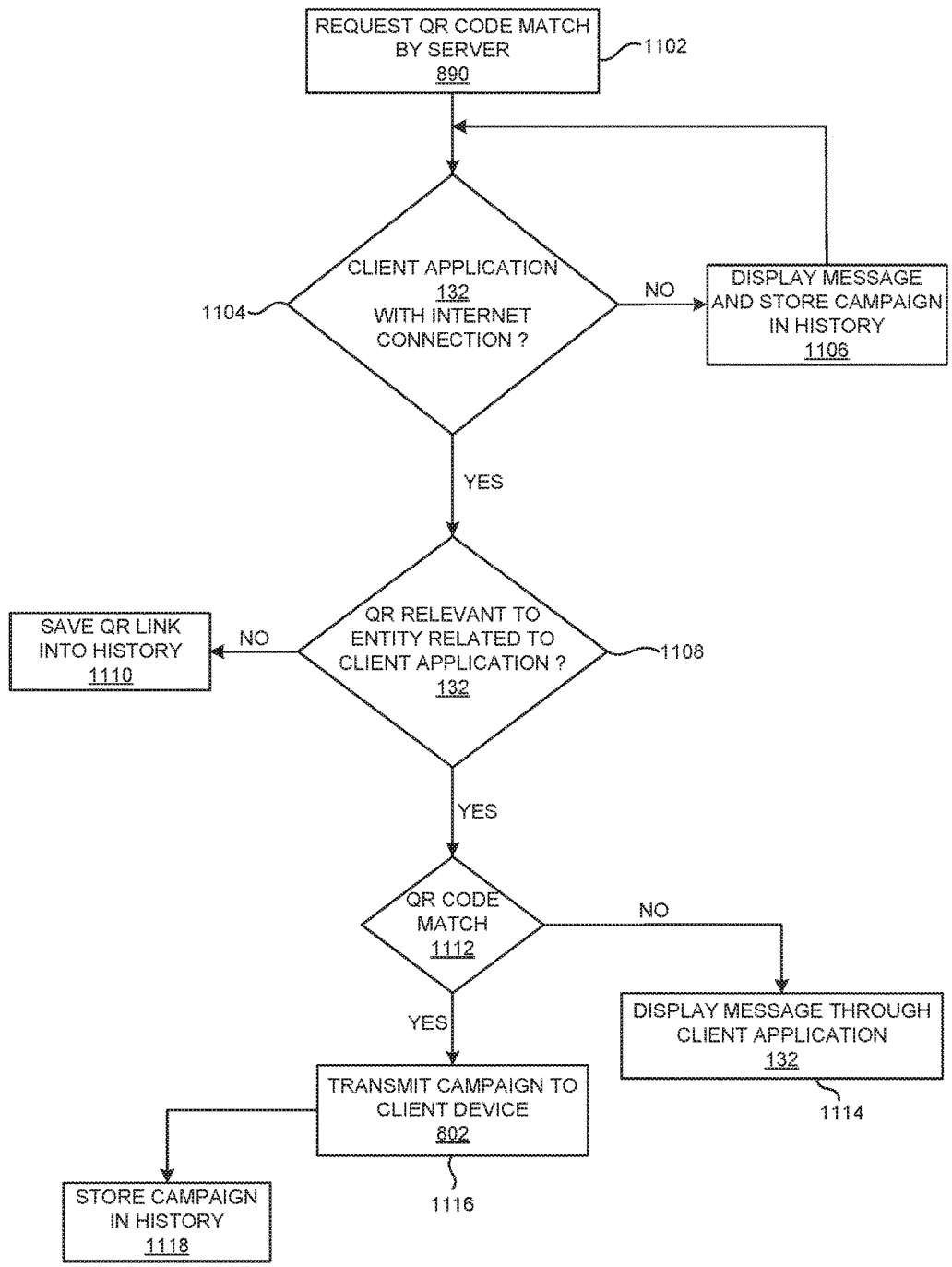
FIG. 11 is a flowchart detailing the operations involved in a QR campaign process involving print capture, according to one embodiment.

FIG. 11 shows a flowchart detailing the operations involved in a QR campaign process involving print capture, according to one or more embodiments. In one or more embodiments, once client user 107 downloads, installs and executes client application 132, client application 132 may request a QR code match by server 890 (example audio encoding network system 150) in operation 1102. In one or more embodiments, operation 1104 may involve checking whether client application 132 has access to an Internet connection. In one or more embodiments, if no, the relevant message may be displayed and the campaign may be stored in history in operation 1106.

In one or more embodiments, if client application 132 has access to an internet connection, operation 1108 may involve checking whether the QR is relevant to the entity related to client application 132. In one or more embodiments, if no, operation 1110 may involve saving the QR link into history. In one or more embodiments, if yes, operation 1112 may involve checking for a QR code match through server 890. In one or more embodiments, if the result of operation 1112 is No, operation 1114 may involve displaying the message through client application 132. In one or more embodiments, if the result of operation 1112 is Yes, operation 1116 may involve transmitting the campaign to client device 802. In one or more embodiments, operation 1118 may then involve storing the campaign in history.

Figure 12:
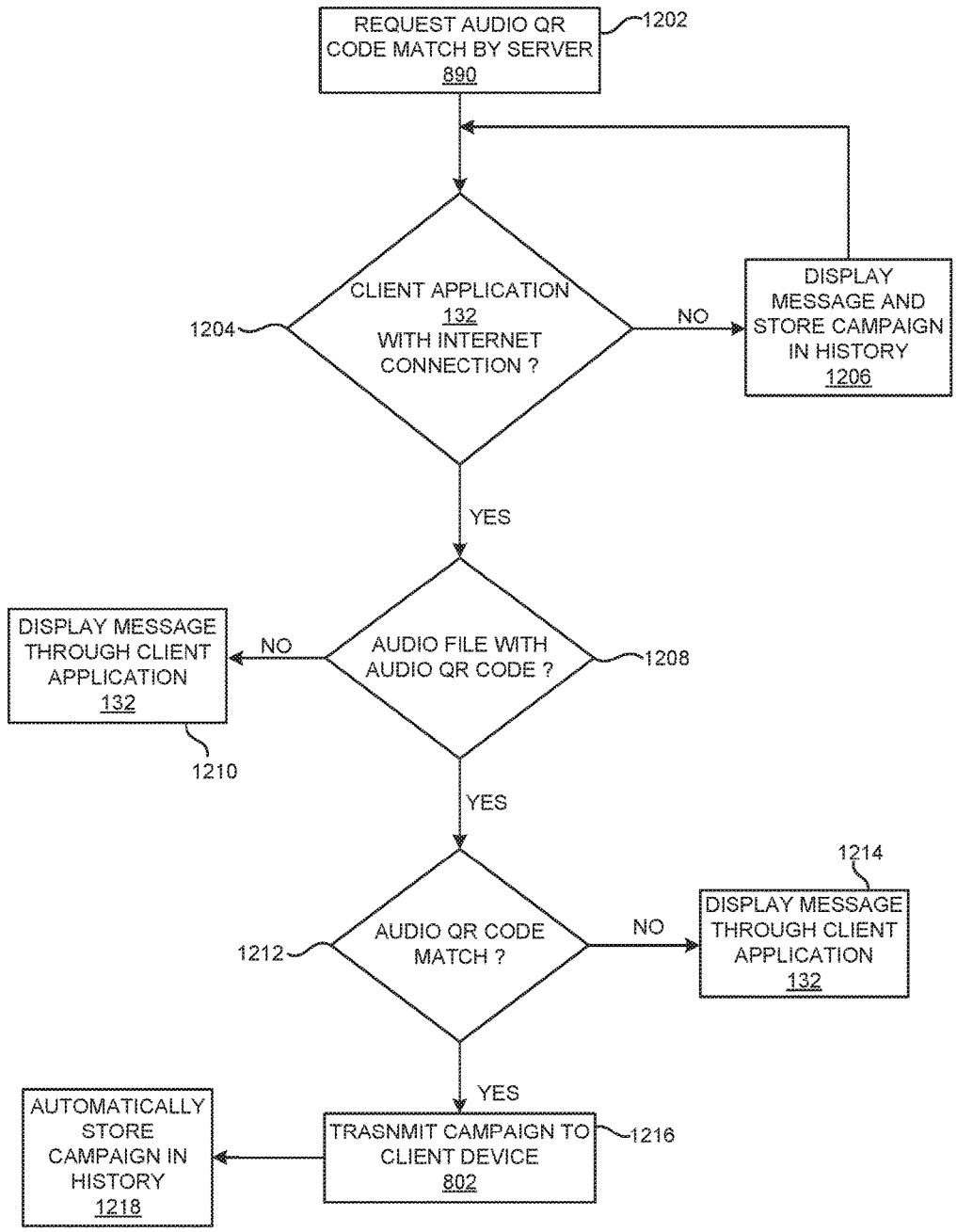
FIG. 12 is a flowchart detailing the operations involved in an audio QR campaign process, according to one embodiment.

FIG. 12 shows a flowchart detailing the operations involved in an audio QR campaign process, according to one or more embodiments. In one or more embodiments, once client user 107 downloads, installs and executes client application 132, client application 132 may request an audio QR code match by server 890 (example audio encoding network system 150) in operation 1202. In one or more embodiments, operation 1204 may involve checking whether client application 132 has access to an Internet connection. In one or more embodiments, if no, the relevant message may be displayed and the campaign may be stored in history in operation 1206.

In one or more embodiments, if client application 132 has access to an internet connection, operation 1208 may involve checking whether the audio file is with an audio QR code. In one or more embodiments, if no, operation 1210 may involve displaying the appropriate message through client application 132. In one or more embodiments, if yes, operation 1212 may involve checking for an audio QR code match through server 890. In one or more embodiments, if the result of operation 1212 is No, operation 1214 may involve displaying the message through client application 132. In one or more embodiments, if the result of operation 1212 is Yes, operation 1216 may involve transmitting the campaign to client device 802. In one or more embodiments, operation 1218 may then involve automatically storing the campaign in history.

Figure 13:
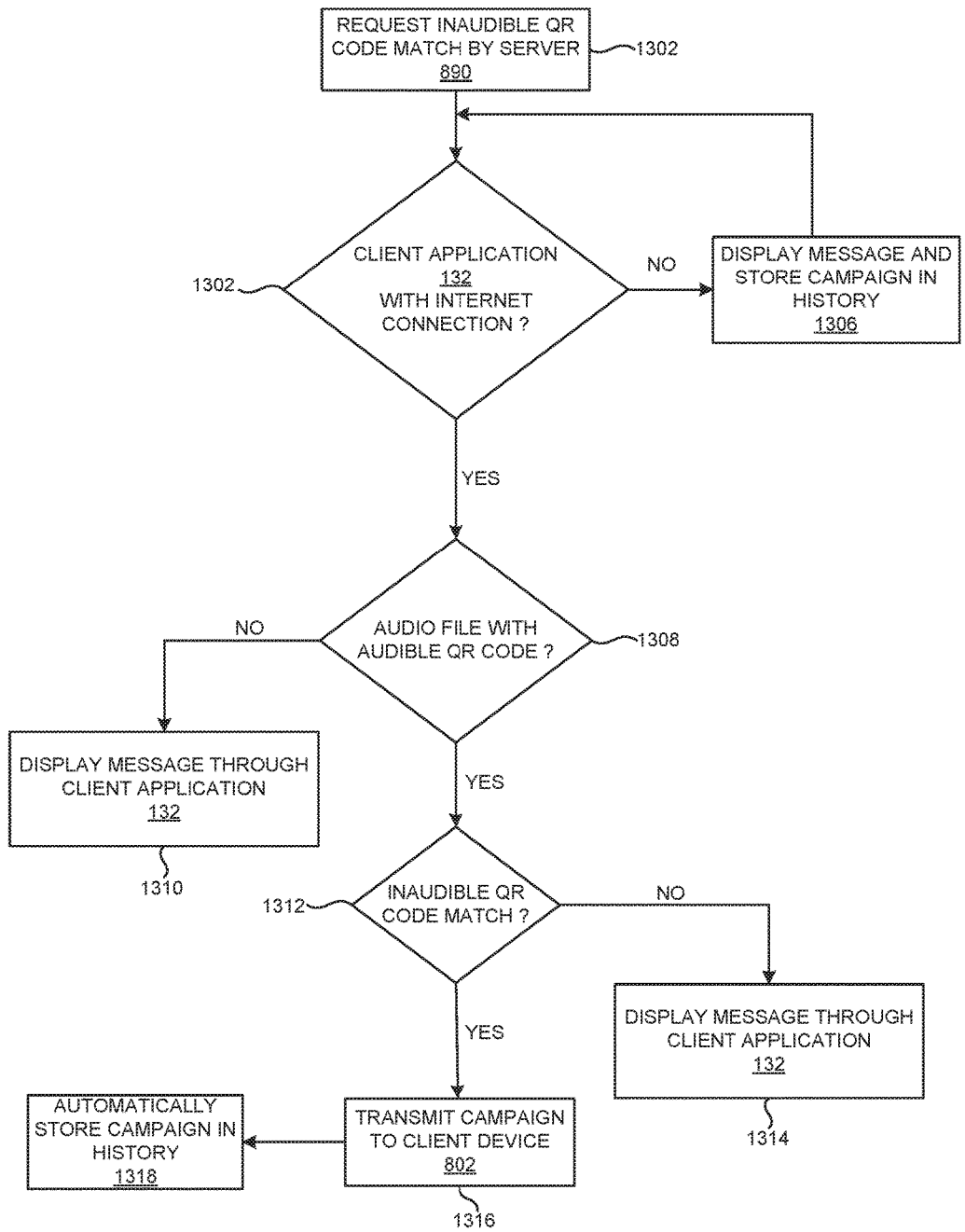
FIG. 13 is a schematic view of a flowchart detailing the operations involved in an inaudible QR campaign process, according to one embodiment.

FIG. 13 shows a flowchart detailing the operations involved in an inaudible QR campaign process, according to one or more embodiments. In one or more embodiments, once client user 107 downloads, installs and executes client application 132, client application 132 may request an inaudible QR code match by server 890 (example audio encoding network system 150) in operation 1302. In one or more embodiments, operation 1304 may involve checking whether client application 132 has access to an Internet connection. In one or more embodiments, if no, the relevant message may be displayed and the campaign may be stored in history in operation 1306.

In one or more embodiments, if client application 132 has access to an internet connection, operation 1308 may involve checking whether the audio file is with an inaudible QR code. In one or more embodiments, if no, operation 1310 may involve displaying the appropriate message through client application 132. In one or more embodiments, if yes, operation 1312 may involve checking for an inaudible QR code match through server 890. In one or more embodiments, if the result of operation 1312 is No, operation 1314 may involve displaying the message through client application 132. In one or more embodiments, if the result of operation 1312 is Yes, operation 1316 may involve transmitting the campaign to client device 802. In one or more embodiments, operation 1318 may then involve automatically storing the campaign in history.

Figure 14:
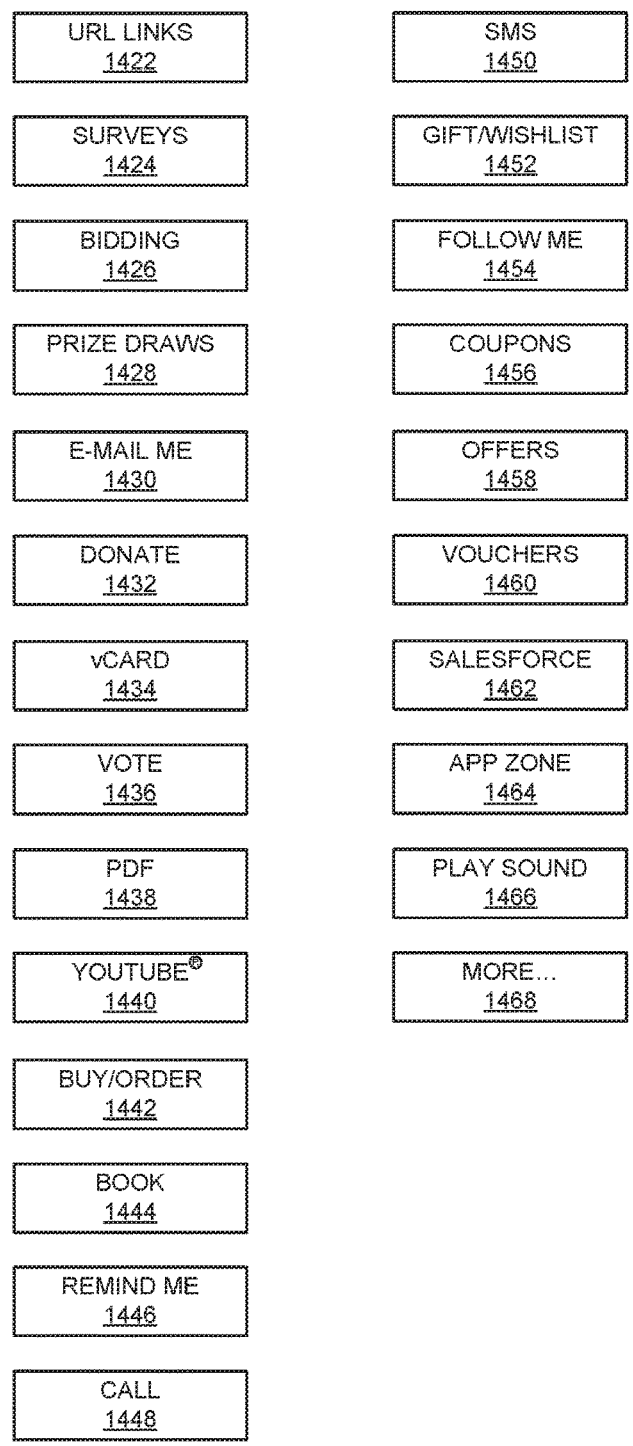
FIG. 14 is a schematic view of example buttons on a landing page provided through the digital platform of FIG. 6 reached by the client user of FIG. 1.

Buttons have been discussed above with respect to button actions 904 and call-back action 105A. Upon clicking a button, a smartlink or a notification during a viewing experience, client user 107 may be directed to a landing page 1402. FIG. 14 shows example buttons 1400 on landing page 1402 reached by client user 107. One or more of the aforementioned buttons 1400 may also be laid out on the notification mentioned above. The example buttons 1400 may include but are not limited to Uniform Resource Locator (URL) links 1422, surveys 1424, bidding 1426 (e.g., price based bidding of products related to user 102/another client user 107), prize draws 1428 (e.g., competitions), E-mail Me 1430 (e.g., e-mailing offers, product pre-release information etc.), Donate 1432 (e.g., to charities, crowd funded activities), vCard 1434 (e.g., electronic business cards), vote 1436 (e.g., on polls), and PDF 1438 (e.g., example file format conversion, information brochures/documents available).

Other example buttons 1400 may include YouTube® 1440 (example media player), Buy/Order 1442 (e.g., e-commerce), Book 1444 (e.g., online reservations), Remind Me 1446 (e.g., adding event(s) to an online calendar), Call 1448 (e.g., response action 104 through telephone), Short Message Service (SMS) 1450 (example text messaging service), Gift/Wishlist 1452, Follow Me 1454 (e.g., social media context), Coupons 1456, Offers 1458, Vouchers 1460, Salesforce 1462 (example software solution for online collaboration and/or customer service), App Zone 1464 (example virtual world/AR experience provided through digital platform 600), and Play Sound 1466. The additional possibilities are covered under More . . . 1468.

Figure 15:
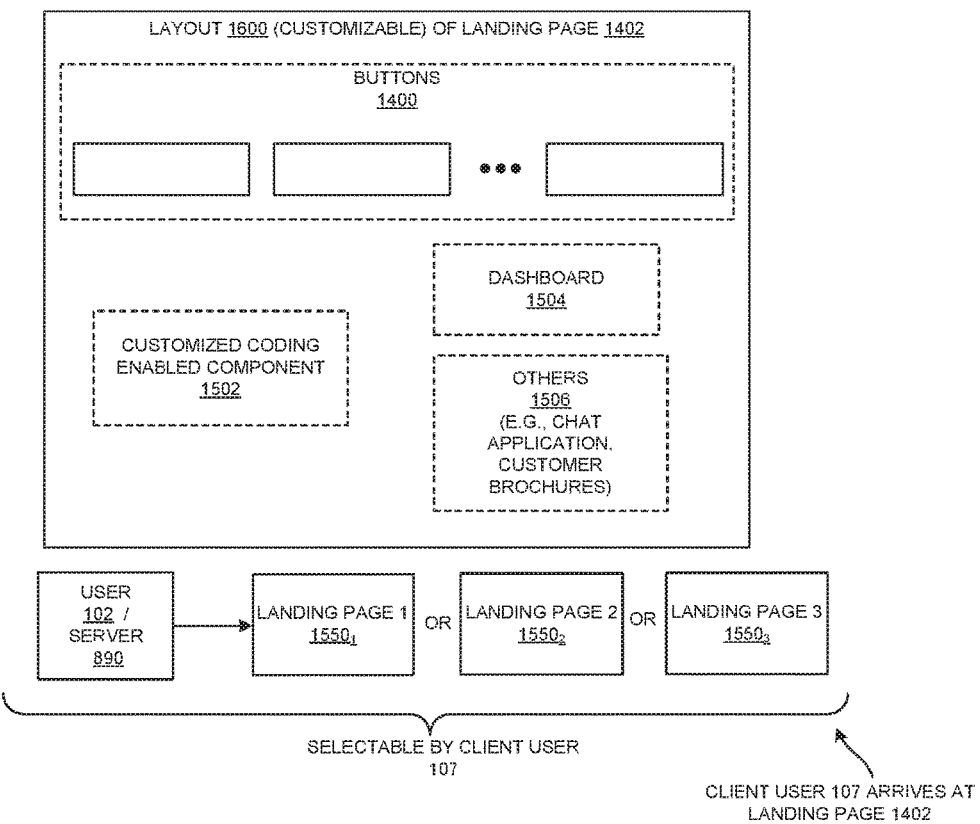
FIG. 15 is a schematic view of an example customizable layout of the landing page of FIG. 14 arrived at by the client user.

In one or more embodiments, landing page 1402 may be generated by server 890/audio encoding network system 150 through processes participated in by user 102. FIG. 15 shows an example customizable layout 1500 of landing page 1402 arrived at by client user 107. Layout 1500 may include buttons 1400 laid out on a virtual display canvas thereof. Layout 1500 may also include elements such as dashboard 1504 (example dashboard 950) of client user 107, chat application(s), customer brochures (both shown as part of others 1506) and advertisements. More importantly, layout 1500 may include a customized coding enabled (software) component 1502 through which client user 107 may edit images and text, and arrange buttons 1400 across layout 1500 in a custom manner. Client user 107 may also be able to arrange applications (or, apps) across layout 1500 in a custom manner.

Thus, exemplary embodiments provide the means for client user 107 to have control over his/her experience of digital platform 600. In contrast to being provided capabilities defined by user 102 and generated through server 890/audio encoding network system 150, exemplary embodiments provide for empowerment of client user 107 based on the aforementioned control. In one example embodiment, several landing page options may be provided to client user 107; FIG. 15 shows landing page 1 1550$_1$, landing page 2 1550$_2$ or landing page 3 1550$_3$ selectable by client user 107. Each of the aforementioned pages may be an example of landing page 1402, and may include a distinct layout (e.g., distinct 1500). These pages may be generated through server 890 in conjunction with user 102, but may provide for additional "choices" available to client user 107. In another example embodiment, client user 107 and/or other client users may have the capability to generate these pages, thereby providing for a user-driven experience on digital platform 600.

In yet another example embodiment, landing page 1 1550$_1$, landing page 2 1550$_2$ and/or landing page 3 1550$_3$ may be subjected to A/B testing; here, landing page 1 1550$_1$, landing page 2 1550$_2$ and landing page 3 1550$_3$ may be "choices" available to client user 107, as discussed above, or different versions of a landing page 1402. Statistical analyses may be performed (e.g., through server 890) to determine performance/user experience related metrics with reference to a given conversion target. A/B testing is known to one skilled in the art; detailed discussed associated therewith has, therefore, been skipped for the sake of convenience.

In one or more embodiments, Artificial Intelligence (AI) (e.g., implemented through server 890) may be employed to find patterns in best performing landing pages (e.g., landing page 1402 associated with an entity such as Minfo®) to provide additional insights to client users (e.g., client user 107)/customers. Here, the "best" performance (e.g., most desired characteristics of landing page 1402 chosen by client users) may be determined through metrics/standards implemented through server 890. Example performance metrics may relate to button colors, whether button colors work better with icons, types of images (e.g., product images, product video frames) and/or whether videos work better. In accordance with the AI implementation, layouts of landing pages may be optimized.

Figure 16:
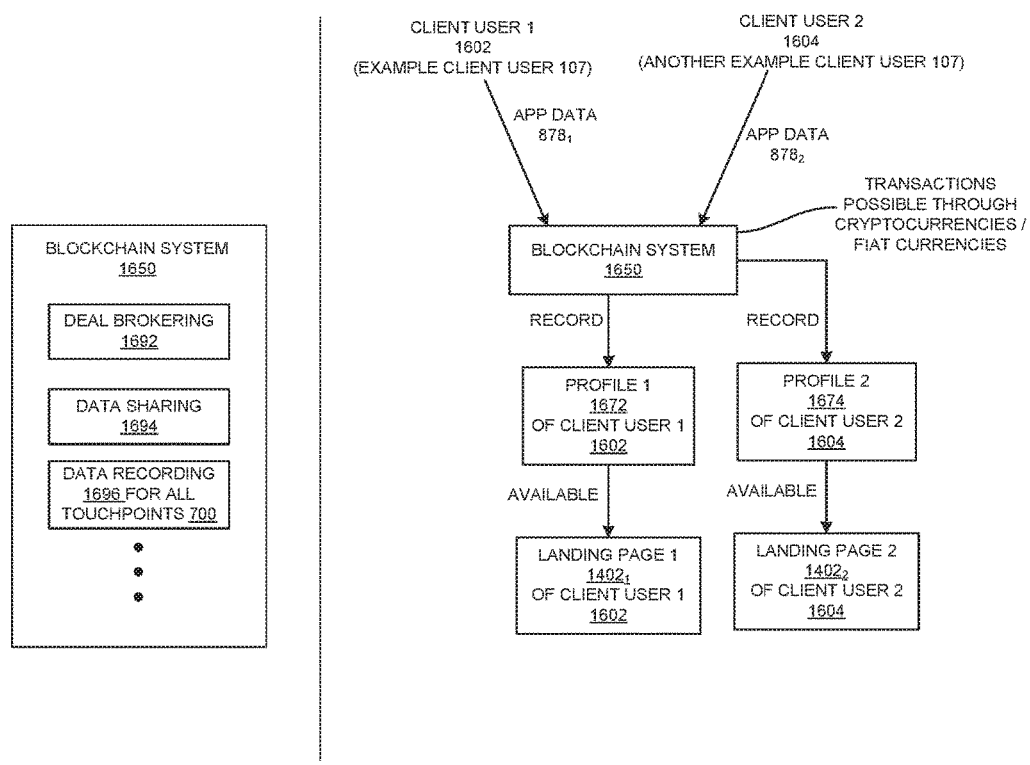
FIG. 16 is a schematic view of a blockchain system implemented through the digital platform of FIG. 6, according to one embodiment.

FIG. 16 shows a blockchain system 1650 (relevant to blockchain 738 touchpoint in FIG. 7) implemented through digital platform 600, according to one or more embodiments. FIG. 16 shows two examples of client user 107, client user 1 1602 and client user 2 1604, each of which provides app data 878$_1$ and app data 878$_2$ (examples of app data 878) based on experience thereof on digital platform 600. Blockchain system 1650 may build records of client user 1 1602 and client user 2 1604 based on app data 878$_1$ and app data 878$_2$ respectively. These records may enable profiling of client user 1 1602 and client user 2 1604. FIG. 16 shows profile 1 1672 of client user 1 1602 and profile 2 1674 of client user 2 1604. In one example implementation, profile 1 1672 and profile 2 1674 may be made available on corresponding landing pages (e.g., landing page 1 1402$_1$ and landing page 2 1402$_2$ respectively) of client user 1 1602 and client user 2 1604.

In one or more embodiments, blockchain system 1650 may render transactions between client user 1 1602 and client user 2 1604 possible via cryptocurrencies/fiat currencies. As a result, exemplary embodiments realized through digital platform 600 may enable connection (e.g., through blockchain system 1650, landing page 1402) of client user 107 to data (e.g., app data 878) thereof. In one or more embodiments, digital platform 600 may enable data authentication through blockchain system 1650 to record app data 878 for all touchpoints 700. Cryptocurrencies may, in one or more embodiments, be external (e.g., Bitcoin) to digital platform 600 or internal thereto.

Empowerment of client user 107/customer may not be limited to landing page 1402 customization options. In one or more embodiments, digital platform 600 may empower client user 107/customer by enabling selling of app data 878 to third-parties (e.g., user 102, other parties) via secure records available due to blockchain system 1650. In one or more embodiments, digital platform 600/blockchain system 1650 may enable brokering of deals (e.g., deal brokering 1692) on behalf of client user 107 based on app data 878. FIG. 16 also shows data sharing 1694 (e.g., topped with rewards for client user 107) and data recording 1696 for all touchpoints 700 enabled through digital platform 600/blockchain system 1650.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., digital platform 600, audio encoding network system 150). Accordingly, the specification and drawings are to be regarded in an illustrative rather than a restrictive sense.

What is claimed is:

1. A method comprising:
  validating, through a digital platform, a user of the digital platform as a publisher of a message as a digital media file;
  encoding, through the digital platform, the digital media file associated with the message with decodable data using a unique identifier, the decodable data in one instance being an audio stream at a frequency audible to a human ear and in another instance being an audio stream at an ultrasound frequency inaudible to the human ear;
  generating, through the digital platform, a modified digital media file from the digital media file based on the encoding of the digital media file associated with the message with the decodable data such that an audio stream associated with the modified digital media file encoded with the decodable data is interpretably indistinguishable from a primary audio stream associated with the digital media file through the human ear;
  capturing, through a client application of a mobile device of a client user of the digital platform, the modified digital media file playing on a broadcasting device to generate capture data therefrom based on metadata associated with the mobile device;
  generating, through the digital platform, response action of the client user based on analyzing the capture data from the mobile device to extract elements therefrom and comparing the extracted elements to data stored in a database;
  associating, through a processor and a memory of the digital platform, the response action of the client user in an interactive form to the message of the publisher, wherein the response action is at least one of a call-back action, a web-form action, and a resource-page redirect action for the client application of the mobile device of the client user, the call-back action being one of: triggering of a phone call to the publisher via a user interface of the client application and a button action via the user interface of the client application, the web-form action being display of a set of forms chosen by the publisher on the user interface of the client application, and the resource-page redirect action being display of a webpage through at least one of: the user interface of the client application and a browser of the mobile device;
  automatically interpreting, through the client application, the modified digital media file in both the one instance and the another instance to decode the decodable data therein;
  enabling, through the client application, the client user to initiate the response action in the interactive form to the message of the publisher without interrupting an experience of concurrent sensing of media content through the broadcasting device by the client user in accordance with the automatic interpretation of the modified digital media file and the association of the response action, the message accompanying the media content being sensed by the client user; and
  via the digital platform, providing, through the client application, a capability to the client user to control data thereof generated through the initiated response action within the digital platform instead of the client user being limited to predefined capabilities within the digital platform.

2. The method of claim 1, further comprising generating, through the digital platform, the unique identifier through a hash function applied to the response action associated with the message of the publisher.

3. The method of claim 1, further comprising providing another capability to the client user to control other data thereof generated by the client application at at least one other touchpoint.

4. The method of claim 3, wherein providing the another capability to the client user further comprises:
  enabling, through a blockchain system implemented in the digital platform, the other data generated by the client application at the at least one other touchpoint to be securely maintained as blockchain records; and
  enabling, through the blockchain records, sharing of the other data by the client user.

5. The method of claim 4, further comprising at least one of:
  enabling, through the digital platform, brokering a deal on behalf of the client user based on the blockchain records thereof; and
  enabling, through the blockchain system, transactions between the client user and another client user of the digital platform via the client application.

6. The method of claim 1, wherein providing, through the client application, the capability to the client user to control the data thereof generated through the initiated response action further comprises enabling the client user to modify a landing page of the publisher arrived at through the client application following the initiation of the response action.

7. The method of claim 6, wherein enabling the client user to modify the landing page of the publisher comprises at least one of:

rendering, through the digital platform, a layout of the landing page customizable by the client user;
providing, through the digital platform, a customized coding enabled component on the landing page to enable the client user program the landing page; and
providing, through the digital platform, at least one application on the landing page.

8. A non-transitory medium, readable through a digital platform and comprising instructions embodied therein that are executable through the digital platform, comprising instructions to:
validate a user of the digital platform as a publisher of a message as a digital media file;
encode the digital media file associated with the message with decodable data using a unique identifier, the decodable data in one instance being an audio stream at a frequency audible to a human ear and in another instance being an audio stream at an ultrasound frequency inaudible to the human ear;
generate a modified digital media file from the digital media file based on the encoding of the digital media file associated with the message with the decodable data such that an audio stream associated with the modified digital media file encoded with the decodable data is interpretably indistinguishable from a primary audio stream associated with the digital media file through the human ear;
capture, through a client application of a mobile device of a client user of the digital platform, the modified digital media file playing on a broadcasting device to generate capture data therefrom based on metadata associated with the mobile device;
generate a response action of the client user based on analyzing the capture data from the mobile device to extract elements therefrom and comparing the extracted elements to data stored in a database;
associate, through a processor and a memory of the digital platform, the response action of the client user in an interactive form to the message of the publisher, wherein the response action is at least one of a call-back action, a web-form action, and a resource-page redirect action for the client application of the mobile device of the client user, the call-back action being one of: triggering of a phone call to the publisher via a user interface of the client application and a button action via the user interface of the client application, the web-form action being display of a set of forms chosen by the publisher on the user interface of the client application, and the resource-page redirect action being display of a webpage through at least one of: the user interface of the client application and a browser of the mobile device:
automatically interpret, through the client application, the modified digital media file in both the one instance and the another instance to decode the decodable data therein;
enable, through the client application, the client user to initiate the response action in the interactive form to the message of the publisher without interrupting an experience of concurrent sensing of media content through the broadcasting device by the client user in accordance with the automatic interpretation of the modified digital media file and the association of the response action, the message accompanying the media content being sensed by the client user; and
provide, through the client application, a capability to the client user to control data thereof generated through the initiated response action within the digital platform instead of the client user being limited to predefined capabilities within the digital platform.

9. The non-transitory medium of claim 8, further comprising instructions to generate the unique identifier through a hash function applied to the response action associated with the message of the publisher.

10. The non-transitory medium of claim 8, further comprising instructions to provide another capability to the client user to control other data thereof generated by the client application at at least one other touchpoint.

11. The non-transitory medium of claim 10, wherein the instructions to provide the another capability to the client user comprises:
instructions to enable, through a blockchain system implemented in the digital platform, the other data generated by the client application at the at least one other touchpoint to be securely maintained as blockchain records; and
instructions to enable, through the blockchain records, sharing of the other data by the client user.

12. The non-transitory medium of claim 11, further comprising at least one of:
instructions to enable brokering a deal on behalf of the client user based on the blockchain records thereof; and
instructions to enable transactions between the client user and another client user of the digital platform via the client application.

13. The non-transitory medium of claim 8, wherein the instructions to provide, through the client application, the capability to the client user to control the data thereof generated through the initiated response action further comprises instructions to enable the client user to modify a landing page of the publisher arrived at through the client application following the initiation of the response action.

14. The non-transitory medium of claim 13, wherein the instructions to enable the client user to modify the landing page of the publisher comprises at least one of:
instructions to render a layout of the landing page customizable by the client user;
instructions to provide a customized coding enabled component on the landing page to enable the client user program the landing page; and
instructions to provide at least one application on the landing page.

15. A system comprising:
a mobile device of a client user; and
a digital platform:
to validate a user of the digital platform as a publisher a message as a digital media file,
to encode the digital media file associated with the message with decodable data using a unique identifier, the decodable data in one instance being an audio stream at a frequency audible to a human ear and in another instance being an audio stream at an ultrasound frequency inaudible to the human ear,
to generate a modified digital media file from the digital media file based on the encoding of the digital media file associated with the message with the decodable data such that an audio stream associated with the modified digital media file encoded with the decodable data is interpretably indistinguishable from a primary audio stream associated with the digital media file through the human ear,
to enable capturing, through a client application of the mobile device of the client user, the modified digital media file playing on a broadcasting device to generate capture data therefrom based on metadata associated with the mobile device, to generate a response action of the client user based on analyzing the capture data from the mobile device to extract elements therefrom and comparing the extracted elements to data stored in a database, to associate, through a processor and a memory of the digital platform, the response action of the client user in an interactive form to the message of the publisher, wherein the response action is at least one of a call-back action, a web-form action, and a resource-page redirect action for the client application of the mobile device of the client user, the call-back action being one of: triggering of a phone call to the publisher via a user interface of the client application and a button action via the user interface of the client application, the web-form action being display of a set of forms chosen by the publisher on the user interface of the client application, and the resource-page redirect action being display of a webpage through at least one of: the user interface of the client application and a browser of the mobile device, to enable automatic interpretation, through the client application, the modified digital media file in both the one instance and the another instance to decode the decodable data therein, to enable, through the client application, the client user to initiate the response action in the interactive form to the message of the publisher without interrupting an experience of concurrent sensing of media content through the broadcasting device by the client user in accordance with the automatic interpretation of the modified digital media file and the association of the response action, the message accompanying the media content being sensed by the client user, and to provide, through the client application, a capability to the client user to control data thereof generated through the initiated response action within the digital platform instead of the client user being limited to predefined capabilities within the digital platform.

16. The system of claim 15, wherein the digital platform provides another capability to the client user to control other data thereof generated by the client application at at least one other touchpoint.

17. The system of claim 16, wherein the digital platform provides the another capability to the client user in accordance with:

enabling, through a blockchain system implemented in the digital platform, the other data generated by the client application at the at least one other touchpoint to be securely maintained as blockchain records, and enabling, through the blockchain records, sharing of the other data by the client user.

18. The system of claim 17, wherein the digital platform is further configured to at least one of:

enable brokering a deal on behalf of the client user based on the blockchain records thereof, and enable transactions between the client user and another client user of the digital platform via the client application.

19. The system of claim 15, wherein the digital platform provides, through the client application, the capability to the client user to control the data thereof generated through the initiated response action in accordance with enabling the client user to modify a landing page of the publisher arrived at through the client application following the initiation of the response action.

20. The system of claim 19, wherein the digital platform enables the client user to modify the landing page of the publisher in accordance with at least one of:

rendering a layout of the landing page customizable by the client user, providing a customized coding enabled component on the landing page to enable the client user program the landing page, and providing at least one application on the landing page.

* * * * *